(12) United States Patent
Yamamura et al.

(10) Patent No.: US 8,006,041 B2
(45) Date of Patent: Aug. 23, 2011

(54) PREFETCH PROCESSING APPARATUS, PREFETCH PROCESSING METHOD, STORAGE MEDIUM STORING PREFETCH PROCESSING PROGRAM

(75) Inventors: Shuji Yamamura, Kawasaki (JP); Takashi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 12/042,891

(22) Filed: Mar. 5, 2008

(65) Prior Publication Data
US 2008/0229072 A1    Sep. 18, 2008

(30) Foreign Application Priority Data
Mar. 14, 2007   (JP) ................................. 2007-065482

(51) Int. Cl.
*G06F 12/00* (2006.01)

(52) U.S. Cl. ........ 711/137; 711/118; 711/213; 711/204; 712/205; 712/206; 712/207

(58) Field of Classification Search .................. 711/137, 711/118, 154, 204, 213, 216; 712/205, 206, 712/207
See application file for complete search history.

(56) References Cited

U.S. PATENT DOCUMENTS
2004/0193807 A1   9/2004   Mogi et al.
2004/0268085 A1   12/2004  Hara et al.
2005/0210201 A1*  9/2005   So et al. ........................ 711/137

FOREIGN PATENT DOCUMENTS
JP   A 2004-295458   10/2004
JP   A 2005-18553    1/2005

* cited by examiner

*Primary Examiner* — Midys Rojas
(74) *Attorney, Agent, or Firm* — Greer, Burns & Crain, Ltd.

(57) ABSTRACT

A prefetch processing apparatus includes a central-processing-unit monitor unit that monitors processing states of the central processing unit in association with time elapsed from start time of executing a program. A cache-miss-data address obtaining unit obtains cache-miss-data addresses in association with the time elapsed from the start time of executing the program, and a cycle determining unit determines a cycle of time required for executing the program. An identifying unit identifies a prefetch position in a cycle in which a prefetch-target address is to be prefetched by associating the cycle determined by the cycle determining unit with the cache-miss data addresses obtained by the cache-miss-data address obtaining unit. The prefetch-target address is an address of data on which prefetch processing is to be performed.

11 Claims, 17 Drawing Sheets

| CACHE-MISS-DATA ADDRESS | ACCESS TIME | CYCLE |
|---|---|---|
| 0xa0000020 | 2570 | 900 |

FIG. 4

$$CPI = \frac{\text{THE NUMBER OF CYCLES EXECUTED IN MEASUREMENT PERIOD}}{\text{THE NUMBER OF INSTRUCTIONS IN MEASUREMENT PERIOD}}$$

FIG. 5

| MEASUREMENT PERIOD | ELAPSED TIME [ns] (MEASUREMENT START – END) | CPI |
|---|---|---|
| MEASUREMENT PERIOD 1 | 1201 ns – 1300 ns | 1.9 |
| MEASUREMENT PERIOD 2 | 1301 ns – 1400 ns | 1.9 |
| MEASUREMENT PERIOD 3 | 1401 ns – 1500 ns | 1.4 |
| MEASUREMENT PERIOD 4 | 1501 ns – 1600 ns | 1.5 |
| MEASUREMENT PERIOD 5 | 1601 ns – 1700 ns | 2.5 |
| MEASUREMENT PERIOD 6 | 1701 ns – 1800 ns | 2.6 |
| MEASUREMENT PERIOD 7 | 1801 ns – 1900 ns | 2.7 |
| MEASUREMENT PERIOD 8 | 1901 ns – 2000 ns | 2.5 |
| MEASUREMENT PERIOD 9 | 2001 ns – 2100 ns | 2.6 |
| MEASUREMENT PERIOD 10 | 2101 ns – 2200 ns | 1.9 |
| MEASUREMENT PERIOD 11 | 2201 ns – 2300 ns | 1.9 |
| MEASUREMENT PERIOD 12 | 2301 ns – 2400 ns | 1.4 |
| MEASUREMENT PERIOD 13 | 2401 ns – 2500 ns | 1.5 |
| MEASUREMENT PERIOD 14 | 2501 ns – 2600 ns | 2.5 |
| MEASUREMENT PERIOD 15 | 2601 ns – 2700 ns | 2.6 |
| MEASUREMENT PERIOD 16 | 2701 ns – 2800 ns | 2.7 |
| MEASUREMENT PERIOD 17 | 2801 ns – 2900 ns | 2.5 |
| MEASUREMENT PERIOD 18 | 2901 ns – 3000 ns | 2.6 |
| ⋮ | ⋮ | ⋮ |

FIG. 6

| | ACCESS TIME [ns] | FUNCTION | INSTRUCTION ADDRESS | CACHE-MISS-DATA ADDRESS |
|---|---|---|---|---|
| MEASUREMENT PERIOD 1<br>1201 ns — 1300 ns | 1210 | A | 0x40006560 | 0x82305500 |
| | 1280 | A | 0x40007580 | 0x82305510 |
| | 1290 | A | 0x40005040 | 0x82304300 |
| | 1292 | A | 0x40000010 | 0x82304300 |
| | 1299 | A | 0x40000020 | 0xadef5510 |
| | 1300 | A | 0x40030010 | 0x30020040 |
| MEASUREMENT PERIOD 2<br>1301 ns — 1400 ns | 1310 | A | 0x40000010 | 0x30020050 |
| | 1330 | A | 0x40000020 | 0x30020000 |
| | 1340 | A | 0x40000010 | 0x30020050 |
| | 1360 | A | 0x40005040 | 0x30020000 |
| | 1365 | A | 0x40006560 | 0x30020050 |
| | 1367 | A | 0x40030030 | 0x30020000 |
| | 1390 | A | 0x40030020 | 0x30020050 |
| MEASUREMENT PERIOD 3<br>1401 ns — 1500 ns | 1420 | B | 0x40030140 | 0x33450900 |
| | 1430 | B | 0x40030160 | 0x32450090 |
| | 1450 | B | 0x40030190 | 0x32330000 |
| | 1460 | B | 0x40030200 | 0x32450090 |
| | 1470 | B | 0x40030240 | 0x30020050 |
| MEASUREMENT PERIOD 4<br>1501 ns — 1600 ns | 1501 | B | 0x40030140 | 0x33450900 |
| | 1510 | B | 0x40030160 | 0x34500000 |
| | 1515 | B | 0x40030190 | 0x33450010 |
| | 1530 | B | 0x40030200 | 0x34567000 |
| | 1550 | B | 0x40030240 | 0x00120000 |
| MEASUREMENT PERIOD 5<br>1601 ns — 1700 ns | 1650 | C | 0x40040010 | 0xa0000020 |
| | 1660 | C | 0x40040010 | 0xa0000020 |
| | 1670 | C | 0x40040010 | 0xa0000020 |
| ⋮ | ⋮ | ⋮ | ⋮ | ⋮ |
| MEASUREMENT PERIOD 10<br>2101 ns — 2200 ns | 2111 | A | 0x40006560 | 0x82305500 |
| | 2182 | A | 0x40007580 | 0x82305510 |
| | 2189 | A | 0x40005040 | 0x82304300 |
| | 2192 | A | 0x40000010 | 0x82304300 |
| | 2199 | A | 0x40000020 | 0xadef5510 |
| MEASUREMENT PERIOD 11<br>2201 ns — 2300 ns | 2228 | A | 0x40000020 | 0x30020000 |
| | 2241 | A | 0x40000010 | 0x30020050 |
| | 2261 | A | 0x40005040 | 0x30020000 |
| | 2264 | A | 0x40006560 | 0x30020050 |
| | 2267 | A | 0x40030030 | 0x30020000 |
| | 2290 | A | 0x40030020 | 0x30020050 |
| MEASUREMENT PERIOD 12<br>2301 ns — 2400 ns | 2319 | B | 0x40030140 | 0x33450900 |
| | 2328 | B | 0x40030160 | 0x32450090 |
| | 2351 | B | 0x40030190 | 0x32330000 |
| | 2361 | B | 0x40030200 | 0x32450090 |
| | 2369 | B | 0x40030240 | 0x30020050 |
| MEASUREMENT PERIOD 13<br>2401 ns — 2500 ns | 2401 | B | 0x40030140 | 0x33450900 |
| | 2410 | B | 0x40030160 | 0x34500000 |
| | 2430 | B | 0x40030200 | 0x34567000 |
| | 2450 | B | 0x40030240 | 0x00120000 |
| MEASUREMENT PERIOD 14<br>2501 ns — 2600 ns | 2550 | C | 0x40040010 | 0xa0000020 |
| | 2560 | C | 0x40040010 | 0xa0000020 |
| | 2570 | C | 0x40040010 | 0xa0000020 |
| ⋮ | ⋮ | ⋮ | ⋮ | ⋮ |

FIG. 7

| CPI | INSTRUCTION ADDRESS | CACHE-MISS-DATA ADDRESS | ACCESS TIME | MEASUREMENT START TIME |
|---|---|---|---|---|
| 1.9 | 0x40000010 | 0x30020050 | 1340 | 1301 |
| 2.5 | 0x40040010 | 0xa0000020 | 1670 | 1601 |
| 2.5 | 0x40040010 | 0xa0000020 | 2570 | 2501 |

MATCH

2501 − 1601 = 900
→ CYCLE = 900 ns

FIG. 8

| CACHE-MISS-DATA ADDRESS | ACCESS TIME | CYCLE |
|---|---|---|
| 0xa0000020 | 2570 | 900 |

FIG. 13

| MEASUREMENT PERIOD | ELAPSED TIME [ns] (MEASUREMENT START – END) | CPI |
|---|---|---|
| MEASUREMENT PERIOD 1 | 1201 ns — 1300 ns | 1.9 |
| MEASUREMENT PERIOD 2 | 1301 ns — 1400 ns | 1.9 |
| MEASUREMENT PERIOD 3 | 1401 ns — 1500 ns | 1.4 |
| MEASUREMENT PERIOD 4 | 1501 ns — 1600 ns | 1.5 |
| MEASUREMENT PERIOD 5 | 1601 ns — 1700 ns | 2.5 |
| MEASUREMENT PERIOD 6 | 1701 ns — 1800 ns | 2.6 |
| MEASUREMENT PERIOD 7 | 1801 ns — 1900 ns | 2.7 |
| MEASUREMENT PERIOD 8 | 1901 ns — 2000 ns | 2.5 |
| MEASUREMENT PERIOD 9 | 2001 ns — 2100 ns | 2.6 |
| MEASUREMENT PERIOD 10 | 2101 ns — 2200 ns | 1.9 |
| MEASUREMENT PERIOD 11 | 2201 ns — 2300 ns | 1.9 |
| MEASUREMENT PERIOD 12 | 2301 ns — 2400 ns | 1.4 |
| MEASUREMENT PERIOD 13 | 2401 ns — 2500 ns | 1.5 |
| MEASUREMENT PERIOD 14 | 2501 ns — 2600 ns | 2.5 |
| MEASUREMENT PERIOD 15 | 2601 ns — 2700 ns | 2.6 |
| MEASUREMENT PERIOD 16 | 2701 ns — 2800 ns | 2.7 |
| MEASUREMENT PERIOD 17 | 2801 ns — 2900 ns | 2.5 |
| MEASUREMENT PERIOD 18 | 2901 ns — 3000 ns | 2.6 |
| MEASUREMENT PERIOD 19 | 3001 ns — 3100 ns | 1.9 |
| MEASUREMENT PERIOD 20 | 3101 ns — 3200 ns | 1.9 |
| MEASUREMENT PERIOD 21 | 3201 ns — 3300 ns | 1.4 |
| MEASUREMENT PERIOD 22 | 3301 ns — 3400 ns | 1.5 |
| MEASUREMENT PERIOD 23 | 3401 ns — 3500 ns | 2.5 |
| MEASUREMENT PERIOD 24 | 3501 ns — 3600 ns | 2.6 |
| MEASUREMENT PERIOD 25 | 3601 ns — 3700 ns | 2.7 |
| MEASUREMENT PERIOD 26 | 3701 ns — 3800 ns | 2.5 |
| MEASUREMENT PERIOD 27 | 3801 ns — 3900 ns | 2.6 |
| MEASUREMENT PERIOD 28 | 3901 ns — 4000 ns | 1.9 |
| MEASUREMENT PERIOD 29 | 4001 ns — 4100 ns | 1.9 |
| MEASUREMENT PERIOD 30 | 4101 ns — 4200 ns | 1.4 |
| MEASUREMENT PERIOD 31 | 4201 ns — 4300 ns | 1.5 |
| MEASUREMENT PERIOD 32 | 4301 ns — 4400 ns | 2.5 |
| MEASUREMENT PERIOD 33 | 4401 ns — 4500 ns | 2.6 |
| MEASUREMENT PERIOD 34 | 4501 ns — 4600 ns | 2.7 |
| MEASUREMENT PERIOD 35 | 4601 ns — 4700 ns | 2.5 |
| MEASUREMENT PERIOD 36 | 4701 ns — 4800 ns | 2.6 |

FIG. 14

| | ACCESS TIME [ns] | FUNCTION | INSTRUCTION ADDRESS | CACHE-MISS-DATA ADDRESS |
|---|---|---|---|---|
| | . . | . . | . . | . . |
| MEASUREMENT PERIOD 5 1601 ns — 1700 ns | 1650 | C | 0x40040010 | 0xa0000020 |
| | 1660 | C | 0x40040010 | 0xa0000020 |
| | 1670 | C | 0x40040010 | 0xa0000020 |
| | . . | . . | . . | . . |
| MEASUREMENT PERIOD 14 2501 ns — 2600 ns | 2550 | C | 0x40040010 | 0xa0000020 |
| | 2560 | C | 0x40040010 | 0xa0000020 |
| | 2570 | C | 0x40040010 | 0xa0000020 |
| | . . | . . | . . | . . |
| MEASUREMENT PERIOD 23 3401 ns — 3500 ns | 3450 | C | 0x40040010 | 0xa0000020 |
| | 3460 | C | 0x40040010 | 0xa0000020 |
| | 3470 | C | 0x40040010 | 0xa0000020 |
| | . . | . . | . . | . . |
| MEASUREMENT PERIOD 32 4301 ns — 4400 ns | 4350 | C | 0x40040010 | 0xa0000020 |
| | 4360 | C | 0x40040010 | 0xa0000020 |
| | 4370 | C | 0x40040010 | 0xa0000020 |
| | . . | . . | . . | . . |

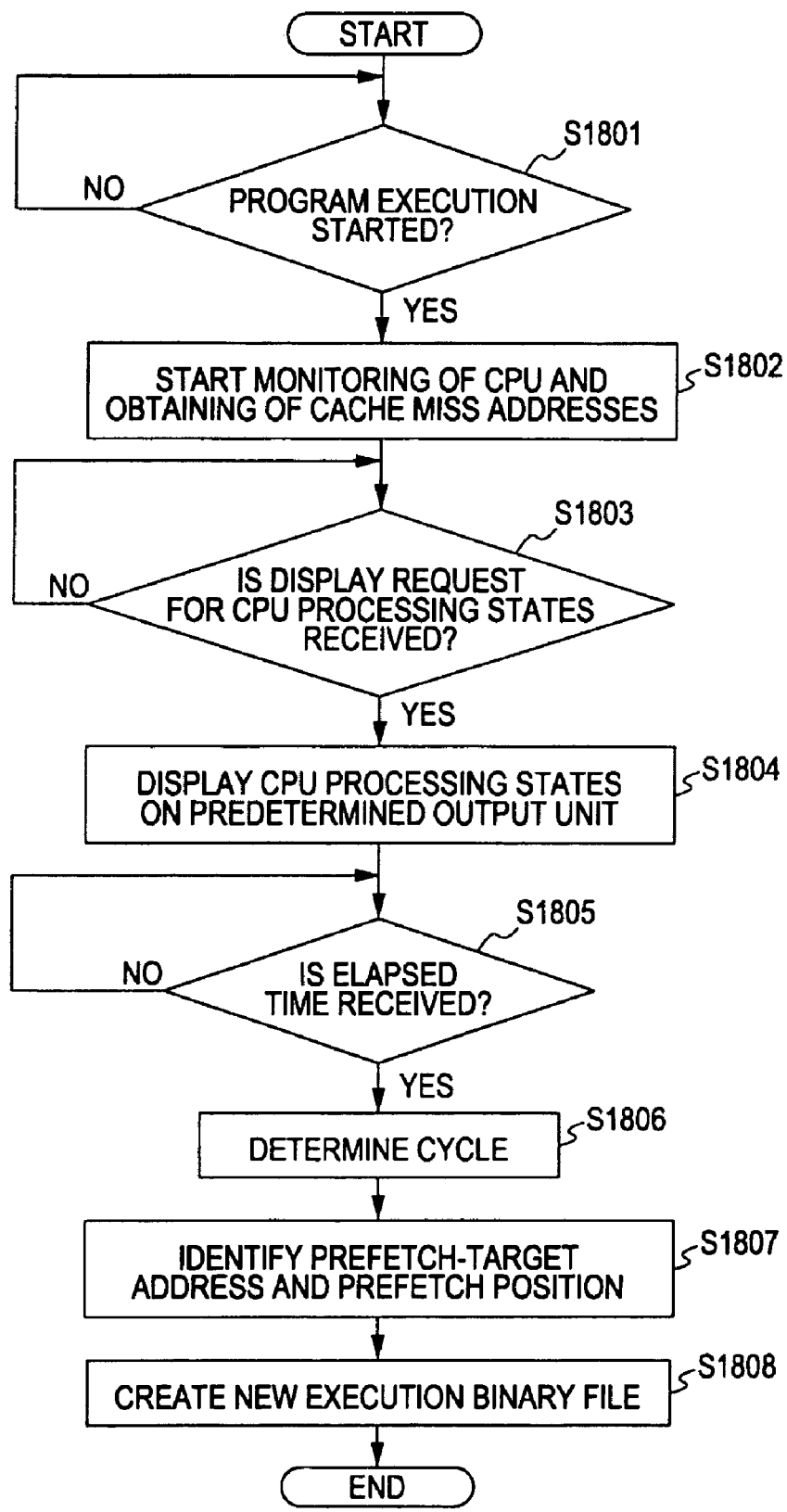

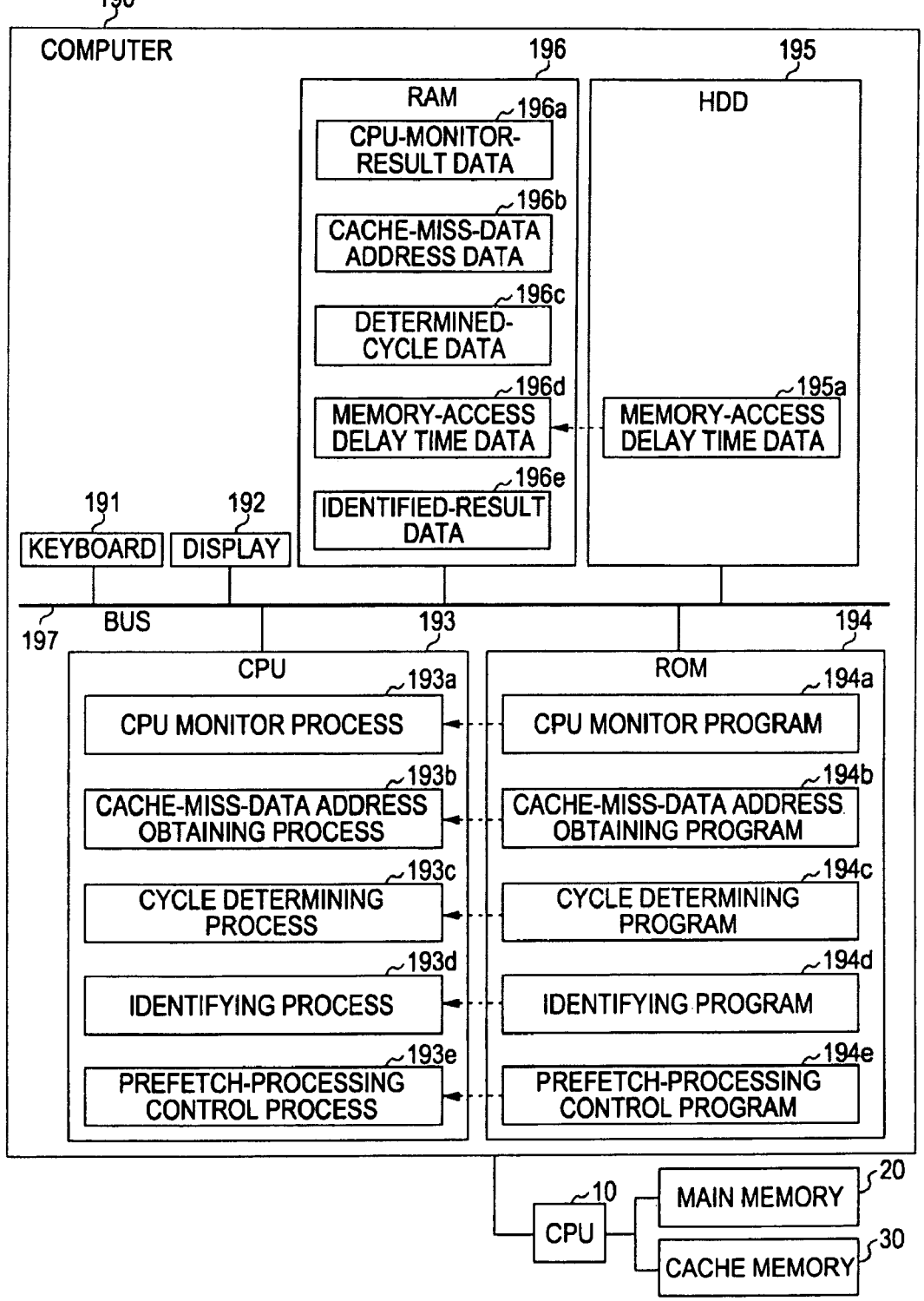

PREFETCH PROCESSING APPARATUS, PREFETCH PROCESSING METHOD, STORAGE MEDIUM STORING PREFETCH PROCESSING PROGRAM

BACKGROUND

Conventionally, data used when a CPU (central processing unit) executes a program is preloaded from a main memory to a cache memory to perform prefetch processing corresponding to the delay time of memory access.

Hardware prefetching that uses hardware and software prefetching that uses software are available as the prefetch processing. Hardware prefetching is a scheme in which, based on a data access pattern, hardware predicts the next data required by the CPU to prefetch the data. In contrast, software prefetching is a scheme in which a prefetch instruction is inserted into a program, so that data is read to a cache in response to the prefetch instruction issued from software.

For a program in which many branch instructions are issued, an interface circuit that prefetches branch addresses for executing instructions after the branch instructions are issued is known to allow an improvement in the fetch efficiency of a program in which a specific branch address appears repeatedly.

For a database system, a data pre-reading method in which information regarding a SQL (structured query language) statement that appears many times and the execution start information of the processing of the statement are obtained and a data pre-reading direction is issued to a storage device based on the obtained information is known to allow an improvement in the fetch efficiency of a program in which processing specified by a specific SQL statement is repeatedly executed.

SUMMARY

According to an aspect of an embodiment, a prefetch processing apparatus performs prefetch processing for preloading data from a main memory to a cache memory, the data being used when a central processing unit executes a program. The prefetch processing apparatus includes a central-processing-unit monitor unit that monitors, during the execution of the program, processing states of the central processing unit in association with time elapsed from start time of executing the program. A cache-miss-data address obtaining unit obtains, during the execution of the program, cache-miss-data addresses in association with the time elapsed from the start time of executing the program, the cache-miss-data addresses being addresses of data resulting from accessing the main memory due to cache miss. A cycle determining unit determines a cycle of time required for executing the program, based on the central-processing-unit processing states monitored by the central-processing-unit monitor unit, and an identifying unit identifies a prefetch position in a cycle in which a prefetch-target address is to be prefetched by associating the cycle determined by the cycle determining unit with the cache-miss data addresses obtained by the cache-miss-data address obtaining unit, the prefetch-target address being an address of data on which prefetch processing is to be performed.

BRIEF DESCRIPTION OF THE DRAWINGS

FIG. 4 illustrates a CPU monitor unit in the first embodiment;

FIG. 5 is a table illustrating a CPU-monitor-result storage unit in the first embodiment;

FIG. 6 is a table illustrating a cache-miss-data address storage unit in the first embodiment;

FIG. 7 illustrates a cycle determining unit in the first embodiment;

FIG. 8 is a table illustrating a determined-cycle storage unit in the first embodiment;

FIG. 13 is a table illustrating a CPU-monitor-result storage unit in the second embodiment;

FIG. 14 is a table illustrating a cache-miss-data address storage unit in the second embodiment;

FIG. 18 is a flowchart illustrating processing of the computing system of the third embodiment; and FIG. 19 is a block diagram showing a computer for executing a prefetch processing program according to a variation of the first embodiment.

EMBODIMENTS

The above-described known technology has a problem in that a program that is repeatedly executed cannot be subjected to prefetch processing that is effective to improve the execution performance of the program.

For example, for a program that executes functions including function A, function B, and function C, when optimum time for performing prefetch processing on data accessed during the execution of the function C exists when the function A is executed, prefetch processing cannot be performed on the data. Thus, the above-described known technology has a problem in that prefetch processing that is effective to improve the execution performance of the program cannot be performed.

A prefetch processing apparatus, a prefetch processing program, and a prefetch processing method according to embodiments of the present invention will be described below with reference to the accompanying drawings. The following description will be given of an example of a computing system to which a prefetch processing apparatus is applied.

First Embodiment

Figure 1:
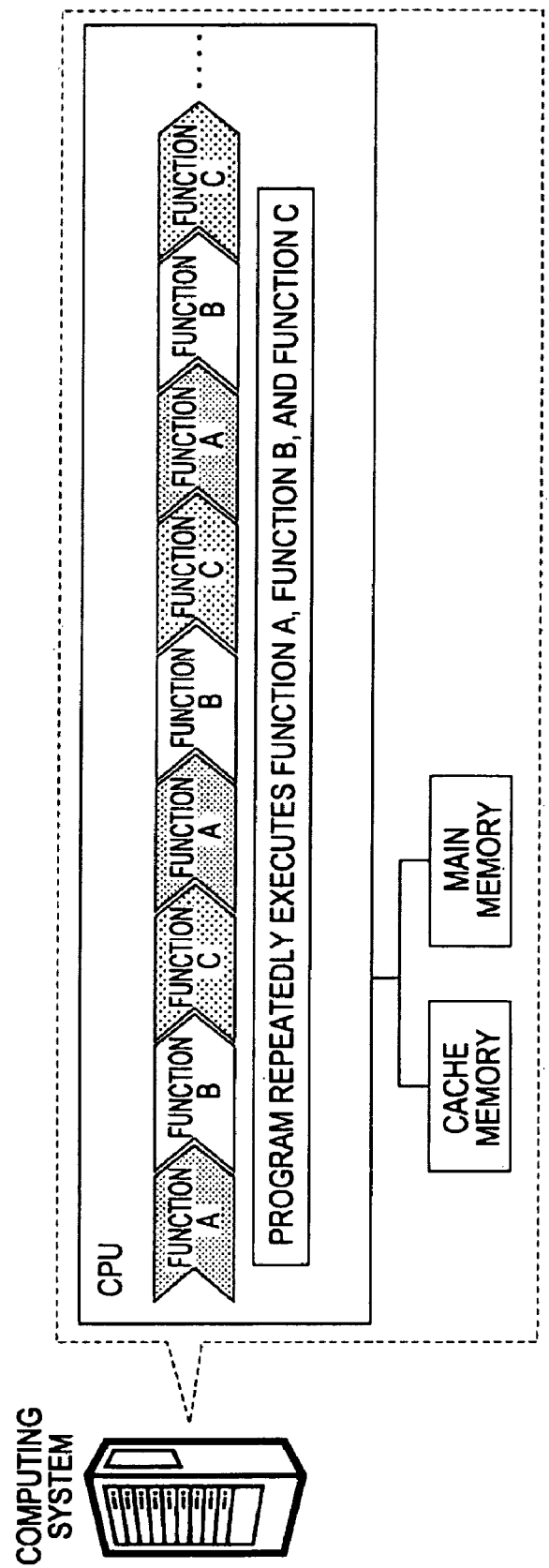
FIG. 1 illustrates an overview of a computing system according to a first embodiment of the present invention.
Figure 2:
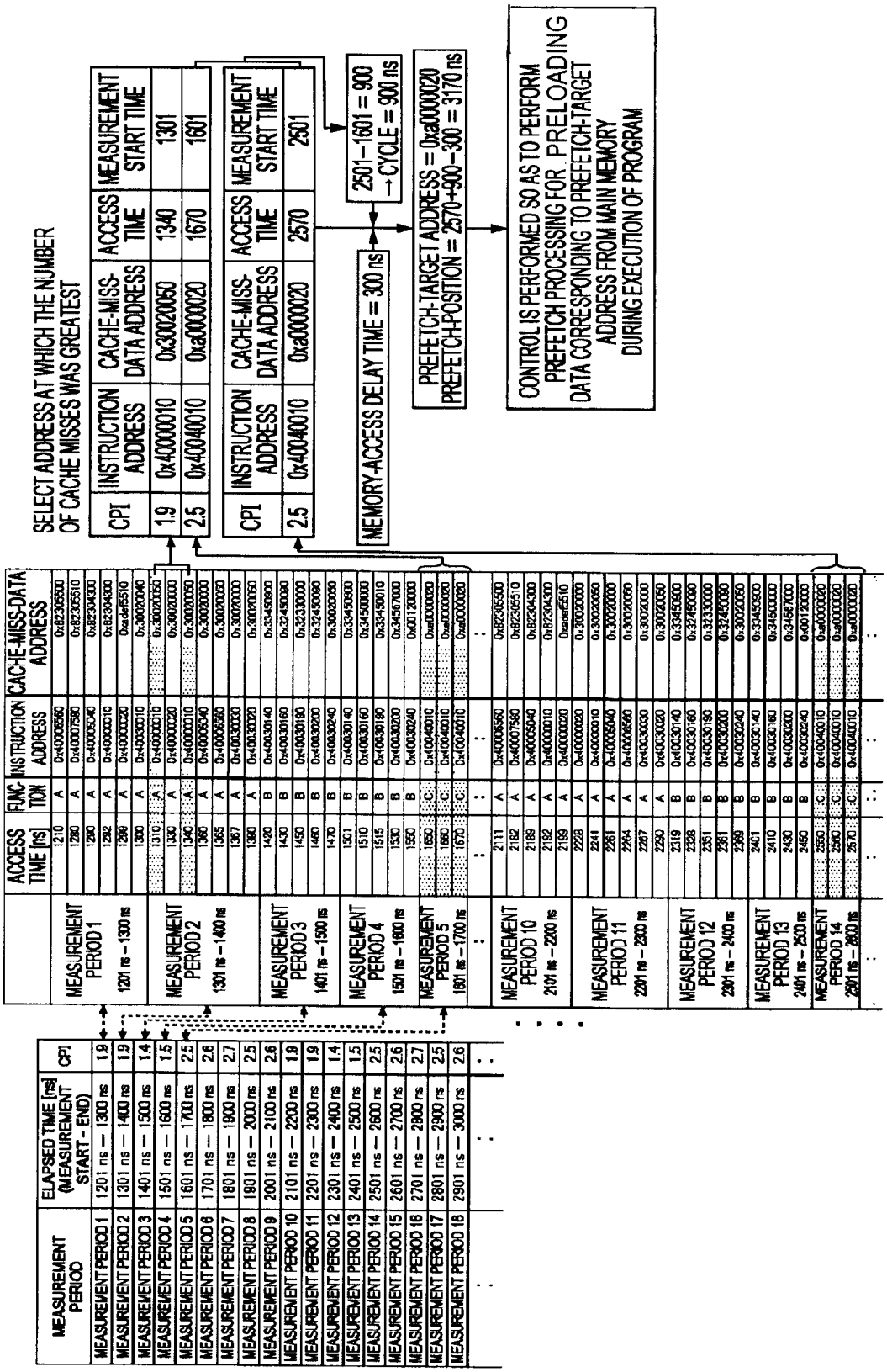
FIG. 2 illustrates features of the computing system of the first embodiment.

FIG. 1 illustrates an overview of a computing system according to a first embodiment of the present invention. FIG. 2 illustrates features of the computing system according to the first embodiment.

In the computing system of the first embodiment, prefetch processing for preloading data from a main memory to a cache memory is performed, the data being used when a CPU (central processing unit) executes a program.

As shown in FIG. 1, in the computing system of the first embodiment, the CPU executes a program that repeats calculations including three types of functions, i.e., function A, function B, and function C. By preloading the data used when the CPU executes the program from the main memory to the cache memory, it is possible to perform prefetch processing corresponding to a memory-access delay time. The cache memory is a high-speed and small-capacity memory for storing fetched data and is placed adjacent to the CPU, and the main memory is a low-speed and large-capacity memory for storing data and programs.

When the CPU executes a program, the computing system of the first embodiment monitors a processing state of the CPU in association with time elapsed from the start time of executing the program.

For example, the computing system of the first embodiment monitors, as the processing state of the CPU, a CPI (Clock cycle Per Instruction) that the CPU requires to process a single instruction of a program in a predetermined time. In this case, the CPI corresponds to an average number of clocks.

That is, as shown in the left table in FIG. 2, the computing system measures CPIs for respective measurement periods from time elapsed from the start time of executing the program, each measurement period having 100 nanoseconds (ns). A nanosecond is one of a billionth of a second. For example, the results of the measurement of the computing system show that the CPI for 100 ns in measurement period 3 (measurement start time "1401 ns" to measurement end time "1500 ns") is 1.4 and the CPI for 100 ns in measurement period 5 (measurement start time "1601 ns" to measurement end time "1700 ns") is 2.5.

In this case, a larger CPI value indicates that a large amount of time was required for the CPU to process a single instruction. Thus, for example, it can be determined that the CPU processing state in the measurement period 5 is worse than the CPU processing state in the measurement period 3. The user can set the measurement periods to arbitrary values.

During the execution of the program, the computing system of the first embodiment obtains cache-miss-data addresses in association with time elapsed from the program execution time, the cache-miss-data addresses being the addresses resulting from accessing the main memory due to cache miss. That is, when the CPU accesses the cache memory to retrieve data used for executing the program and the data does not exist therein (i.e., the data is not prefetched), the CPU determines that the caching is a cache miss and accesses the main memory to retrieve the data. During the processing, the computing system of the first embodiment obtains, as a cache-miss-data address, the address of the data in question in association with time elapsed from the program execution start time. In general, when a cache miss occurs, the CPU temporarily stops the processing until corresponding data becomes available.

More specifically, as shown in the middle table in FIG. 2, the computing system of the first embodiment obtains cache-miss-data addresses for each measurement period that is the same as the CPI measurement period. For example, at access time "1650 ns" (which is time elapsed from the program execution start time) in the measurement period 5 (measurement start time "1601 ns" to measurement end time "1700 ns"), a cache miss occurs during retrieval of data (at address "0xa0000020") used for executing an instruction of instruction address "0x40040010". Thus, the computing system acquires the address of the data as cache-miss-data address "0xa0000020". During this processing, the computing system refers to the instruction address "0x40040010" to determine that the instruction address is an instruction address for function C and obtains the instruction address. As shown in the middle table in FIG. 2, in the measurement period 5, similar cache misses occur at the access times "1650 ns", "1660 ns", and "1670 ns".

Based on the CPI (which serves as the monitored processing state of the CPU) in each predetermined time and on the cache-miss-data address at which the number of cache misses was greatest in the predetermined time, the computing system of the first embodiment determines a cycle of time required for executing the program.

More specifically, the computing system of the first embodiment obtains, in an associated manner, the CPI in each measurement period (see the left table in FIG. 2) and the cache-miss-data address (see the middle table in FIG. 2) at which the number of cache misses was greatest in the measurement period. During the processing, the computing system obtains the measurement start time of the measurement period by referring to the left table in FIG. 2, and also obtains the access time and the instruction address of the cache-miss-data address at which the number of cache misses was greatest by referring to the middle table in FIG. 2. In this case, the computing system of the first embodiment performs the above-described processing on a cache-miss-data address at which two or more cache misses occurred, and obtains, as the access time, access time at which the last cache miss occurred in the measurement period.

For example, as shown in the right table in FIG. 2, the computing system obtains a CPI "1.9", instruction address "0x40000010", cache-miss-data address "0x30020050", access time "1340 ns", and measurement stat time "1301 ns" in measurement period 2, and obtains a CPI "2.5", instruction address "0x40040010", cache-miss-data address "0xa0000020", access time "1670 ns", measurement start time "1601 ns" in the measurement period 5. The measurement periods 1, 3, and 4 are excluded from this processing.

As shown in the middle table in FIG. 2, since another target of the processing appears in measurement period 14, the computing system of the first embodiment further obtains a CPI "2.5", instruction address "0x40040010", cache-miss-data address "0xa0000020", access time "2570 ns", and measurement start time "2501 ns".

That is, since the CPI "2.5", the instruction address "0x40040010", and the cache-miss-data address "0xa0000020" appeared repeatedly, the computing system of the first embodiment subtracts the measurement start time "1601 ns" from the measurement start time "2501 ns" to determine that the cycle is 900 ns.

The computing system of the first embodiment associates the determined cycle with the obtained cache-miss-data addresses to identify a prefetch position in a cycle in which a prefetch-target address is to be prefetched, the prefetch-target address being the address of data on which prefetch processing is to be performed.

More specifically, as shown in FIG. 2, the computing system regards, as the prefetch-target address, the cache-miss-data address "0xa0000020" corresponding to the repeatedly appeared CPI "2.5" and the instruction address "0x40040010", and further identifies a prefetch position. The time required for the CPU to access the memory to obtain data has a unique value for each computing system. The computing system of the first embodiment has a memory-access delay time of, for example, 300 ns.

Thus, as shown in FIG. 2, based on the access time "2570 ns" in the measurement period 14, the determined cycle "900 ns", and the memory-access delay time "300 ns", the computing system of the first embodiment obtains 3170 ns (=2570+900−300) as a position in a next cycle in which a prefetch-target address is to be prefetched. The obtained position "3170 ns" corresponds to the time of processing for function A in the next cycle.

Based on the prefetch-target address and the prefetch position, the computing system of the first embodiment performs control so as to perform prefetch processing for preloading data corresponding to the prefetch-target address from the main memory during the execution of the program. More specifically, in the computing system of the first embodiment, the CPU is controlled so as to load the data at 0xa0000020 from the main memory to the cache memory at time "3170 ns".

Accordingly, the computing system of the first embodiment can appropriately insert prefetch processing without using program semantic information, such as a function or an innermost loop, and also can perform prefetch processing that is effective to improve the program execution performance, as the main features described above.

Figure 3:
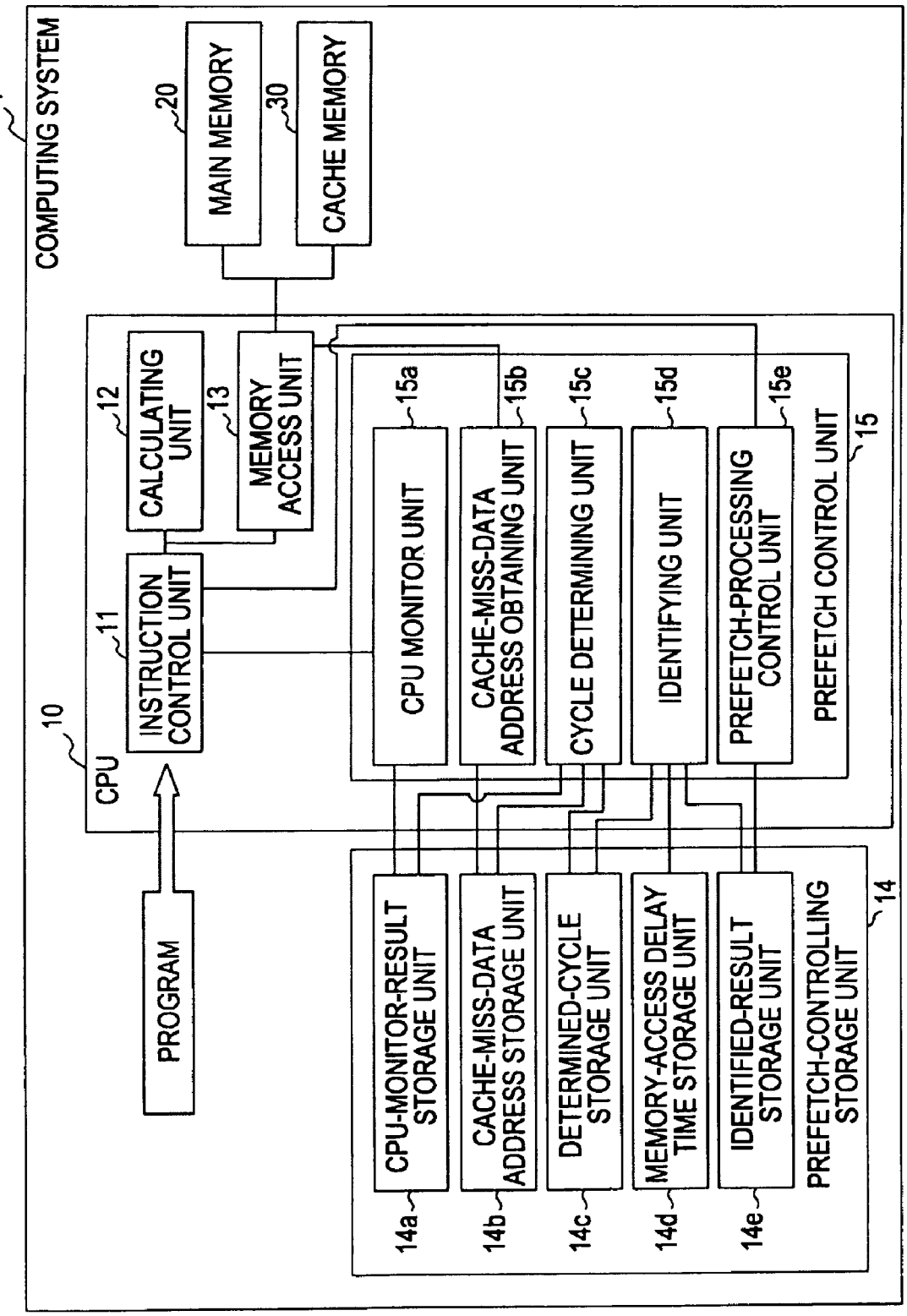
FIG. 3 is a block diagram showing the configuration of the computing system of the first embodiment.
Figure 9:
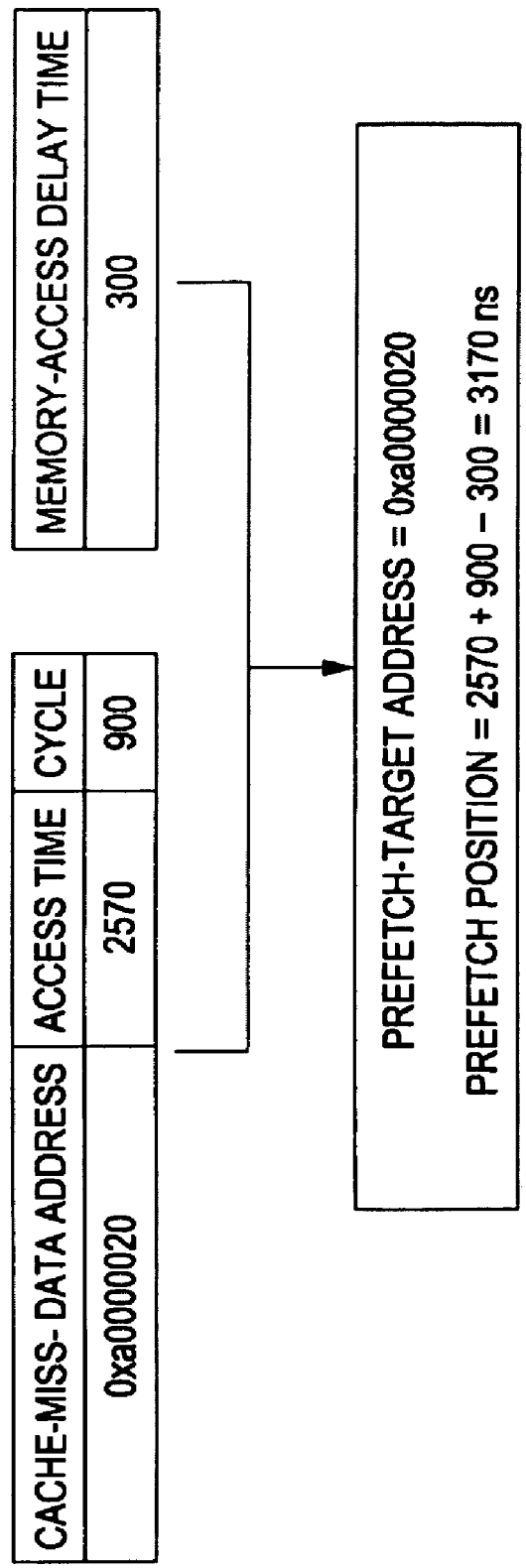
FIG. 9 illustrates an identifying unit in the first embodiment.

The configuration of the computing system of the first embodiment will now be described with reference to FIGS. 3 to 9. FIG. 3 is a block diagram showing the configuration of the computing system of the first embodiment. FIG. 4 illustrates a CPU monitor unit in the first embodiment. FIG. 5 is a table illustrating a CPU-monitor-result storage unit in the first embodiment. FIG. 6 is a table illustrating a cache-miss-data address storage unit in the first embodiment. FIG. 7 illustrates a cycle determining unit in the first embodiment. FIG. 8 illustrates a determined-cycle storage unit in the first embodiment. FIG. 9 illustrates an identifying unit in the first embodiment.

As shown in FIG. 3, the computing system 1 of the first embodiment includes a CPU 10, a main memory 20, a cache memory 30, and a prefetch-controlling storage unit 14. The CPU 10 includes an instruction control unit 11, a calculating unit 12, a memory access unit 13, and a prefetch control unit 15.

The cache memory 30 is a high-speed and small-capacity memory for storing fetched data, and the main memory 20 is a low-speed and large-capacity memory for storing data and programs.

The instruction control unit 11 reads a program to be executed and decodes instructions of the program. The instruction control unit 11 also issues a direction to the calculating unit 12 to execute the instructions, and issues a direction to the memory access unit 13 to access to the cache memory 30 and/or the main memory 20 so as to obtain data used for executing the instructions.

The calculating unit 12 executes instructions described in the program, in accordance with the direction from the instruction control unit 11.

In accordance with the direction from the instruction control unit 11, the memory access unit 13 accesses the cache memory 30 and/or the main memory 20 to obtain data used for executing the instructions. In accordance with the direction from the instruction control unit 11, the memory access unit 13 also preloads (i.e., prefetches) data from the main memory 20 to the cache memory 30.

The prefetch-controlling storage unit 14 stores data used for various types of processing performed by the prefetch control unit 15 and various results of processing performed by the prefetch control unit 15. As shown in FIG. 3, the prefetch-controlling storage unit 14 includes, as elements particularly relevant to the present invention, a CPU-monitor-result storage unit 14a, a cache-miss-data address storage unit 14b, a determined-cycle storage unit 14c, a memory-access delay time storage unit 14d, and an identified-result storage unit 14e. The CPU-monitor-result storage unit 14a stores CPU processing states monitored by a CPU monitor unit 15a described below, the cache-miss-data address storage unit 14b stores cache-miss-data addresses obtained by a cache-miss-data address obtaining unit 15b described below, the determined-cycle storage unit 14c stores a cycle determined by a cycle determining unit 15c described below, the memory-access delay time storage unit 14d stores a memory-access delay time used for processing executed by an identifying unit 15d described below, and the identified-result storage unit 14e stores a prefetch position and a prefetch-target address identified by an identifying unit 15d described below. The individual units are described below.

The prefetch control unit 15 executes various types of processing, based on data obtained from the instruction control unit 11 and the memory access unit 13 and data stored in the prefetch-controlling storage unit 14. As shown in FIG. 3, the prefetch control unit 15 includes the CPU monitor unit 15a, the cache-miss-data address obtaining unit 15b, the cycle determining unit 15c, the identifying unit 15d, and the prefetch-processing control unit 15e. Herein, the CPU monitor unit 15a corresponds to means for monitoring a CPU, the cache-miss-data address obtaining unit 15b corresponds to means for obtaining cache-miss-data addresses, the cycle determining unit 15c corresponds to means for determining a cycle, and the identifying unit 15d corresponds to means for identifying a prefetch position.

During the execution of the program, the CPU monitor unit 15a monitors the processing state of the instruction control unit 11 in association with time elapsed from the program execution start time, and stores the monitoring result in the CPU-monitor-result storage unit 14a. More specifically, the CPU monitor unit 15a monitors, as the processing state of the CPU 10, a CPI (Clock cycle Per Instruction) that the CPU requires to process a single instruction of a program in a predetermined time (in a measurement period). That is, as shown in FIG. 4, the CPU monitor unit 15a determines a CPI by dividing the number of cycles executed in a measurement period by the number of instructions executed in the measurement period. The CPU monitor unit 15a measures CPIs for respective measurement periods from time elapsed from the program execution start time, each measurement period having, for example, 100 ns.

The CPU-monitor-result storage unit 14a Stores the processing results of the CPU monitor unit 15a. That is, as shown in FIG. 5, the stored results indicate that the CPI for 100 ns in the measurement period 3 (measurement start time "1401 ns" to measurement end time "1500 ns") is 1.4 and the CPI for 100 ns in the measurement period 5 (measurement start time "1601 ns" to measurement end time "1700 ns") is 2.5.

During the execution of the program, the cache-miss-data address obtaining unit 15b obtains cache-miss-data addresses from the memory access unit 13 in association with time elapsed from the program-execution start time, the cache-miss-data addresses being the addresses resulting from accessing the main memory 20 due to cache miss. The cache-miss-data address obtaining unit 15b then stores the associated results in the cache-miss-data address storage unit 14b. That is, when the memory access unit 13 accesses the cache memory 30 and correspondent data does not exist therein (i.e., the data is not prefetched), the cache-miss-data address obtaining unit 15b determines that the caching is a cache miss and accesses the main memory 20 to retrieve the data. The cache-miss-data address obtaining unit 15b obtains, as a cache-miss-data address, the address of the data in association with the time elapsed from the program execution start time. For example, the cache-miss-data address obtaining unit 15b obtains cache-miss-data addresses for each measurement period that is the same as the measurement period monitored by the CPU monitor unit 15a. During the processing, by referring to instruction addresses corresponding to the cache-miss-data addresses, the cache-miss-data address obtaining unit 15b also obtains a function for executing the instruction addresses.

The cache-miss-data address storage unit 14b stores the processing results of the cache-miss-data address obtaining unit 15b. For example, as shown in FIG. 6, at access time "1650 ns" (which is time elapsed from the program-execution start time) in the measurement period 5 (measurement start time "1601 ns" to measurement end time "1700 ns"), a cache miss occurs during retrieval of data (at address "0xa0000020") used for executing an instruction of instruction address "0x40040010". Thus, the cache-miss-data address storage unit 14b stores the address of the data in question as cache-miss-data address "0xa0000020". The cache-miss-data address storage unit 14b also stores information indicating that the instruction address "0x40040010" is an instruction address for function C. As shown in FIG. 6, in the measurement period 5, similar cache misses occur at access times "1650 ns", "1660 ns", and "1670 ns".

Based on the CPI (which serves as the monitored processing state of the CPU) in each predetermined time and on the cache-miss-data address at which the number of cache misses was greatest in the predetermined time, the cycle determining unit 15c determines a cycle of time required for executing the program. The cycle determining unit 15c then stores the determined cycle in the determined-cycle storage unit 14c.

More specifically, as shown in FIG. 7, the cycle determining unit 15c obtains, in an associated manner, the measurement-period CPIs (see FIG. 5) stored in the CPU-monitor-result storage unit 14a and the cache-miss-data address (see FIG. 6) at which the number of the cache misses was greatest in the measurement period, the cache-miss-data address being obtained as a result of referring to the cache-miss-data address storage unit 14b. During the processing, the cycle determining unit 15c obtains the measurement start time of the measurement period by referring to the CPU-monitor-result storage unit 14a, and also obtains the access time and the instruction address at which the number of cache misses was greatest by referring to the cache-miss-data address storage unit 14b. The cycle determining unit 15c performs the above-described processing on a cache-miss-data address at which two or more cache misses occurred, and obtains, as the access time, access time at which the last cache miss occurred in the measurement period.

For example, as shown in FIG. 7, the cycle determining unit 15c obtains a CPI "1.9", instruction address "0x40000010", cache-miss-data address "0x30020050", access time "1340 ns", and measurement stat time "1301 ns" in the measurement period 2, and obtains a CPI "2.5", instruction address "0x40040010", cache-miss-data address "0xa0000020", access time "1670 ns", and measurement start time "1601 ns" in the measurement period 5. The measurement periods 1, 3, and 4 are excluded from this processing.

Since another target of the processing appears in measurement period 14, as shown in FIG. 6, the cycle determining unit 15c further obtains a CPI "2.5", instruction address "0x40040010", cache-miss-data address "0xa0000020", access time "2570 ns", and measurement start time "2501 ns" (see FIG. 7).

Since the CPI "2.5", the instruction address "0x40040010", and the cache-miss-data address "0xa0000020" in the measurement period 5 match the CPI, the instruction address, and the cache-miss-data address in the measurement period 14, the cycle determining unit 15c determines that the cache miss occurred repeatedly. Thus, the cycle determining unit 15c determines that the cycle is 900 ns by subtracting the measurement start time "1601 ns" from the measurement start time "2501 ns".

The determined-cycle storage unit 14c stores the processing result of the cycle determining unit 15c. For example, as shown in FIG. 8, the determined-cycle storage unit 14c stores the cache-miss-data address "0xa0000020", the access time "2570 ns", and the cycle "900 ns" in association with each other.

The identifying unit 15d associates the cycle stored in the determined-cycle storage unit 14c with the cache-miss-data addresses to identify a prefetch position in a cycle in which a prefetch-target address is to be prefetched, the prefetch-target address being the address of data on which prefetch processing is to be performed.

More specifically, as shown in FIG. 9, the identifying unit 15d regards the repeatedly appeared cache-miss-data address "0xa0000020" as the prefetch-target address and further identifies a prefetch position.

The time required for the memory access unit 13 to access the cache memory 30 to obtain data has a unique value for each computing system. The memory access time "300 ns" of the computing system 1 is stored in the memory-access delay time storage unit 14d.

That is, as shown in FIG. 9, based on the access time "2570 ns" in the measurement period 14, the determined cycle "900 ns", and the memory-access delay time "300 ns", the identifying unit 15d determines 3170 ns (=2570+900−300) as a position in a next cycle in which a prefetch-target address is to be prefetched. The obtained position "3170 ns" corresponds to the time of processing for function A in the next cycle.

The identified-result storage unit 14e stores the prefetch-target address and prefetch position identified by the identifying unit 15d. For example, the identified-result storage unit 14e stores the prefetch-target address "0xa0000020" and the prefetch position "3170 ns".

Based on the prefetch-target address and prefetch position stored in the identified-result storage unit 14e, the prefetch-processing control unit 15e controls the instruction control unit 11 so as to perform prefetch processing for preloading data corresponding to the prefetch-target address from the main memory 20 during the execution of the program. More specifically, at time "3170 ns", the prefetch-processing control unit 15e controls the instruction control unit 11 so as to preload the data at 0xa0000020 from the main memory 20 to the cache memory 30.

Figure 10:
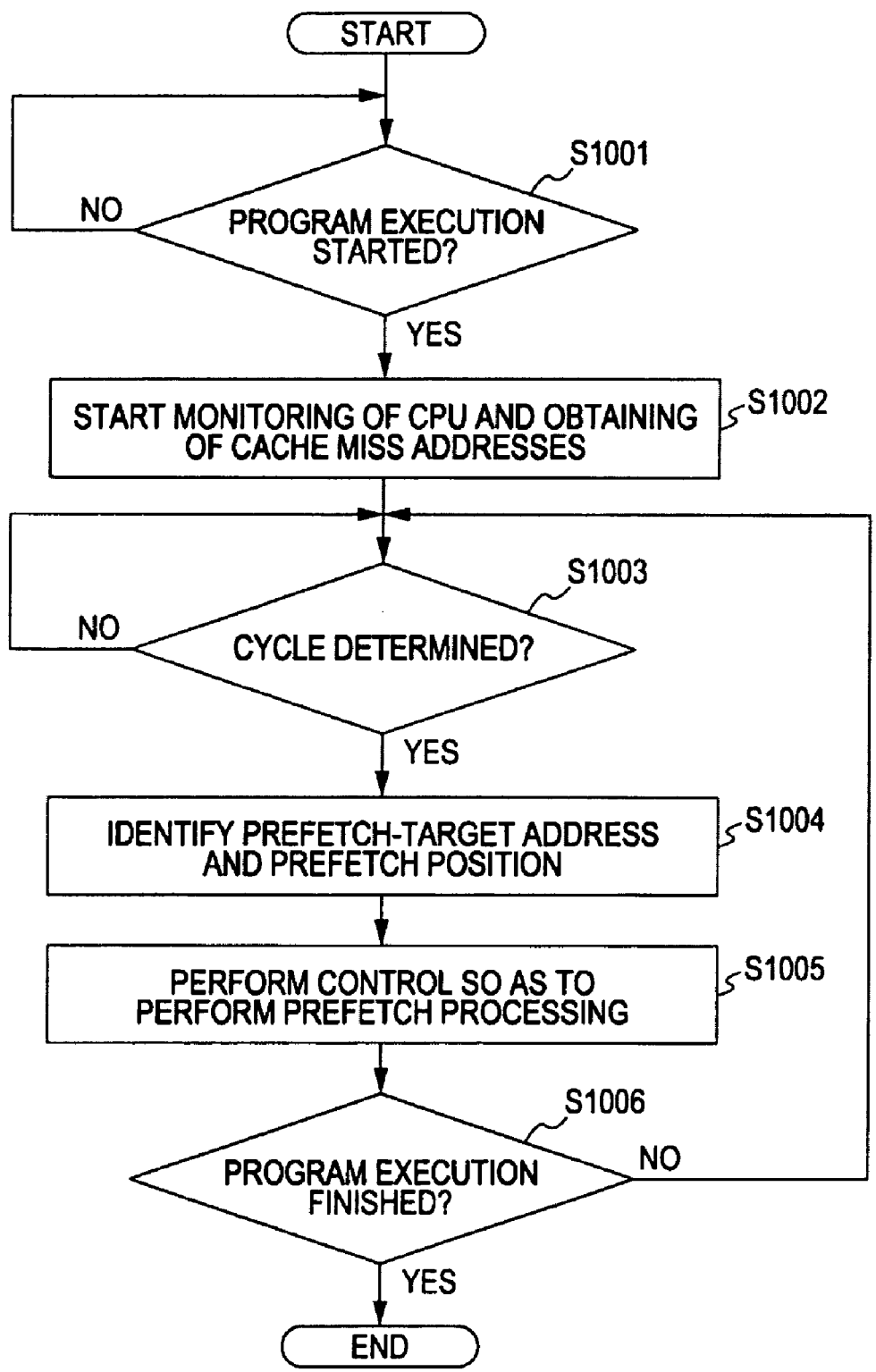
FIG. 10 is a flowchart illustrating processing of the computing system of the first embodiment.

The processing performed by the computing system 1 of the first embodiment will now be described with reference to FIG. 10. FIG. 10 is a flowchart illustrating the processing performed by the computing system 1 of the first embodiment.

When the computing system 1 of the first embodiment starts the execution of a program (i.e., affirmative in step S1001), the CPU monitor unit 15a and the cache-miss-data address obtaining unit 15b start monitoring of the CPU 10 and obtaining of cache-miss-data addresses (in step S1002).

That is, the CPU monitor unit 15a monitors, as the CPU processing state, a CPI (Clock cycle Per Instruction) that the CPU 10 requires to process a single instruction of the program in a predetermined time (in a measurement time). Then, as shown in FIG. 5, the CPU monitor unit 15a stores, for example, a value "2.5" in the CPU-monitor-result storage unit 14a as the CPI for 100 ns in the measurement period 5 (the measurement start time "1601 ns to the measurement end time "1700 ns").

Also, during the execution of the program, the cache-miss-data address obtaining unit 15b obtains cache-miss-data addresses from the memory access unit 13 in association with time elapsed from the program execution start time, the cache-miss-data addresses being the addresses of data resulting from accessing the main memory 20 due to cache miss. For example, as shown in FIG. 6, at access time "1650 ns" in the measurement period 5 (the measurement start time. "1601 ns" to the measurement end time "1700 ns"), a cache miss occurs during retrieval of data (at address "0xa0000020") used for executing an instruction of instruction address "0x40040010". Thus, the cache-miss-data address obtaining unit 15b stores the address "0xa0000020" of the data in the cache-miss-data address storage unit 14b as a cache-miss-data address.

When the cycle determining unit 15c determines the cycle (i.e., affirmative in step S1003), the identifying unit 15d identifies a prefetch-target address and a prefetch position (in step S1004).

That is, when the same combination of a CPI and a cache-miss-data address appears repeatedly, as shown in FIG. 7, the cycle determining unit 15c determines the cycle from the measurement start time. Based on the determined cycle, the identifying unit 15d identifies a prefetch-target address and a prefetch position, as shown in FIG. 9. The identifying unit 15d waits for the processing, when the cycle determining unit 15c does not determine the cycle (i.e., negative in step S1003).

Subsequently, based on the prefetch-target address and the prefetch position stored in the identified-result storage unit 14e by the identifying unit 15d, the prefetch-processing control unit 15e controls the instruction control unit 11 (in step S1005) so as to perform prefetch processing for preloading data corresponding to the prefetch-target address from the main memory 20 during the execution of the program. More specifically, at time "3170 ns", the prefetch-processing control unit 15e controls the instruction control unit 11 so as to preload the data at 0xa0000020 from the main memory 20 to the cache memory 30.

When the execution of the program is finished (i.e., affirmative in step S1006), the computing system 1 of the first embodiment ends the processing. When the execution of the program is not finished (i.e., negative in step S1006), the computing system 1 waits until a combination of a CPI and a cache-miss-data address appears repeatedly.

As described above, according to the first embodiment, when the CPU 10 executes a program, the processing states of the CPU 10 are monitored in association with time elapsed from the program execution start time, and during the execution of the program, cache-miss-data addresses, which are the addresses of data resulting from accessing the main memory 20 due to cache miss, are obtained in association with the time elapsed from the program execution start time. Further, based on the monitored processing states of the CPU 10, the cycle is determined and is associated with the obtained cache-miss-data addresses to identify a prefetch-target address and a prefetch position. This arrangement makes it possible to appropriately insert prefetch processing without using program semantic information, such as a function or an innermost loop, and makes it possible to perform prefetch processing that is effective to improve the execution performance of the program.

According to the first embodiment, based on the identified prefetch-target address and prefetch position, control is performed so as to perform prefetch processing for preloading data corresponding to the prefetch-target address from the main memory 20 to the cache memory 30 during the execution of the program. This arrangement makes it possible to reduce the labor and time costs that the programmer requires to insert prefetch instructions and makes it possible to perform prefetch processing that is effective to improve the execution performance of the program.

According to the first embodiment, the CPIs are monitored as the processing states of the CPU 10, and the cycle is determined by referring to the CPIs. Thus, it is possible to determine the cycle with high accuracy and it is possible to perform prefetch processing that is effective to improve the execution performance of the program.

According to the first embodiment, the cycle is determined based on the CPI monitored in each predetermined time and a cache-miss-data address at which the number of cache misses was greatest in the predetermined time. This arrangement can identify, as a prefetch-target address, a cache-miss-data address that appears a number of times in each period and thus can perform prefetch processing that is effective to improve the execution performance of the program.

Second Embodiment

While the description in the first embodiment has been given of a case in which the cycle is determined based on the CPIs and a cache-miss-data address at which the number of cache misses was greatest, a description in a second embodiment will be given of a case in which the cycle is determined by performing statistical processing on the CPU processing states, such as CPIs.

Figure 11:
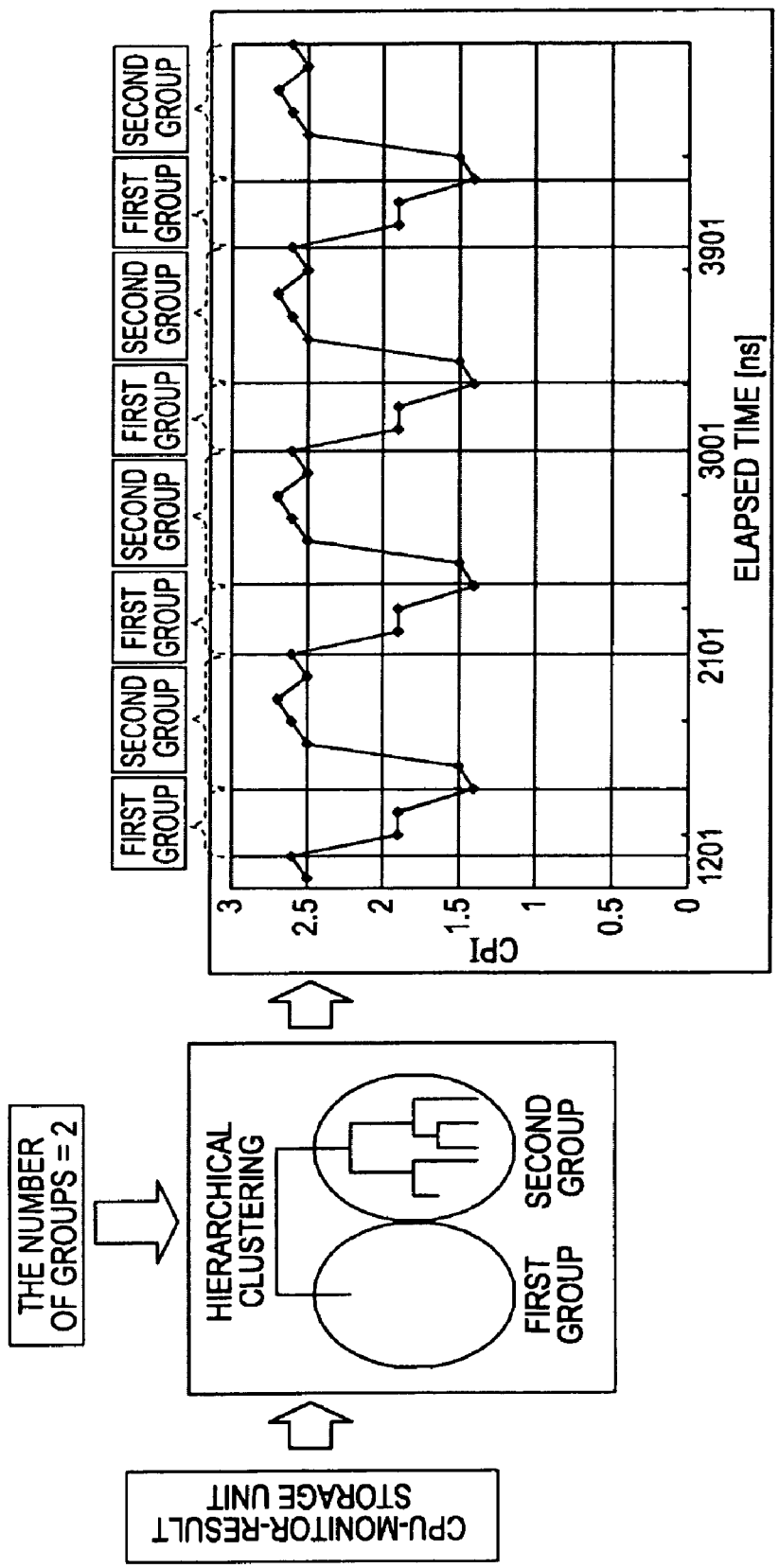
FIG. 11 illustrates an overview and features of a computing system according to a second embodiment.

First, main features of a computing system according to a second embodiment will be specifically described with reference to FIG. 11. FIG. 11 illustrates an overview and features of the computing system of the second embodiment.

The computing system of the second embodiment divides the monitored processing states of the CPU into a predetermined number of groups by using statistical processing, and determines the cycle based on the pattern of repetition of the divided groups.

More specifically, the computing system of the second embodiment uses a hierarchical clustering scheme to perform the statistical processing. As shown in FIG. 11, when the number of groups is specified to two, the computing system divides the CPI measurement results into a first group and a second group. Consequently, for example, as is indicated by the CPI measurement results shown in the graph in FIG. 11, a first group having small CPI values and a second group having large CPI values are repeated. Also, since the start times of the first group are 1201 ns, 2101 ns, 3001 ns, and 3901 ns, the start times are used as cycle start times to determine that the cycle is 900 ns.

Examples of an available algorithm for the hierarchical clustering include complete linkage, single linkage, and Ward's linkage. As in the first embodiment, the computing system of the second embodiment identifies a prefetch-target address and a prefetch position after determining the cycle, and performs control so as to perform prefetch processing for preloading data corresponding to the prefetch-target address from the main memory to the cache memory during the execution of the program.

Consequently, the computing system of the second embodiment can determine the cycle with higher accuracy and can perform prefetch processing that is effective to improve the execution performance of the program.

Figure 12:
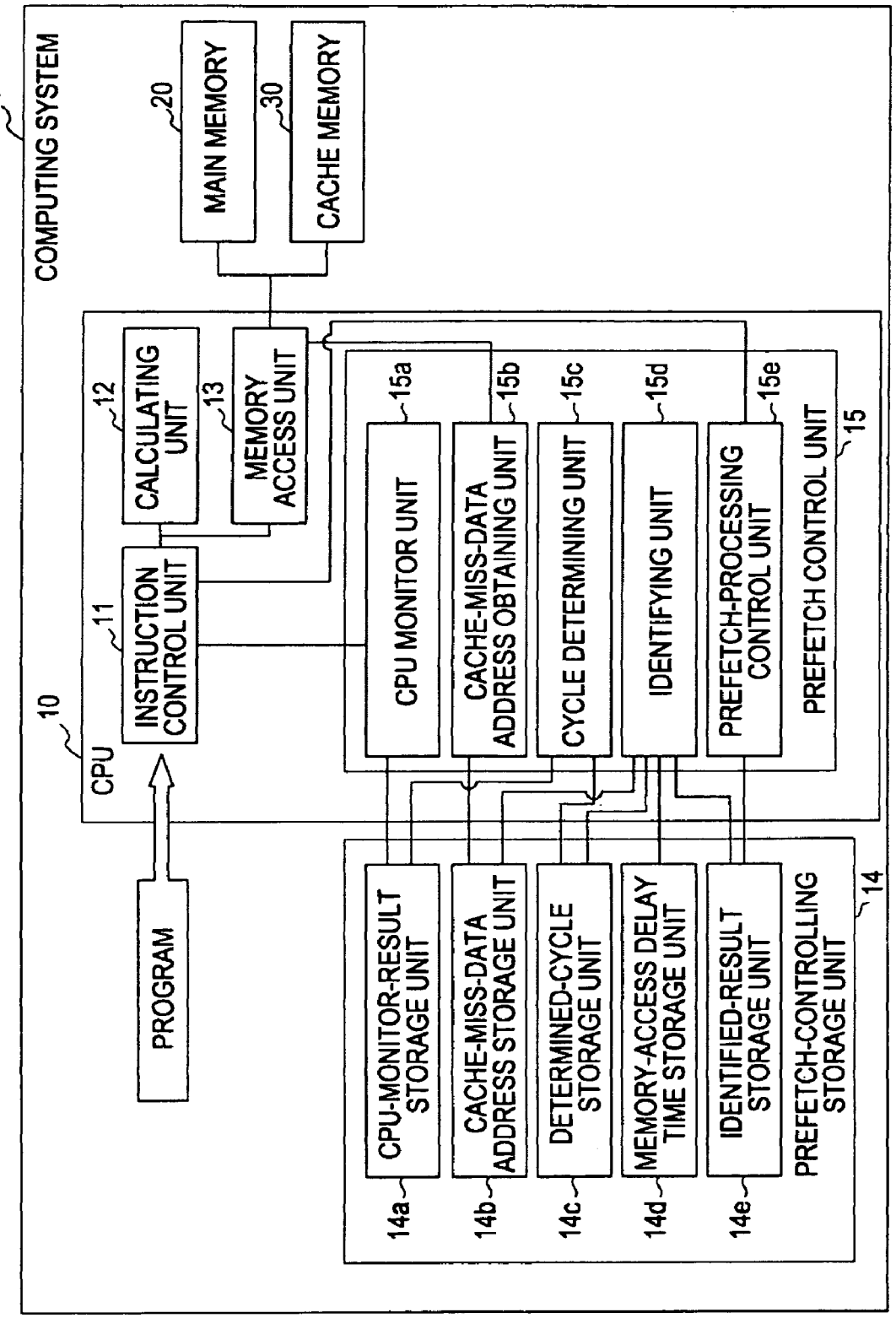
FIG. 12 is a block diagram showing the configuration of the computing system of the second embodiment.
Figure 15:
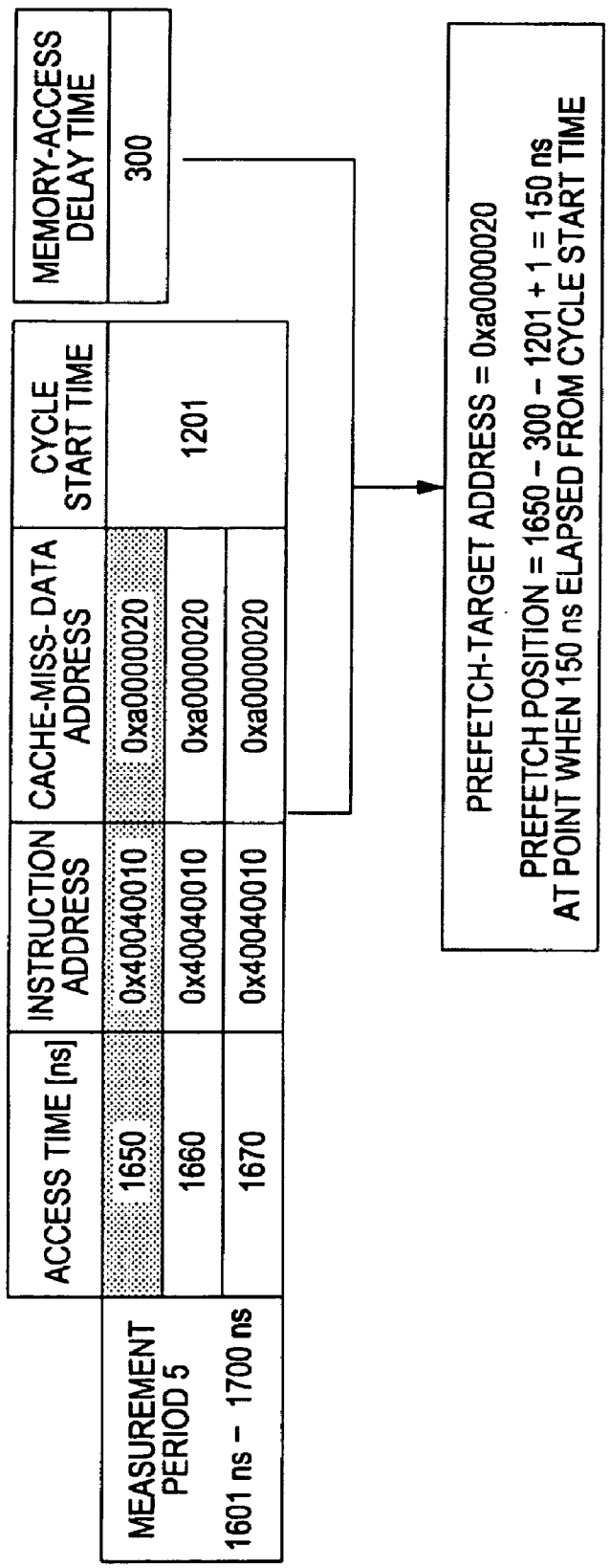
FIG. 15 illustrates an identifying unit in the second embodiment.

The computing system 1 of the second embodiment will now be described with reference to FIGS. 12 to 15. FIG. 12 is a block diagram showing the configuration of the computing system 1 of the second embodiment. FIG. 13 is a table illustrating a CPU-monitor-result storage unit in the second embodiment. FIG. 14 is a table illustrating a cache-miss-data address storage unit in the second embodiment. FIG. 15 illustrates an identifying unit in the second embodiment.

As shown in FIG. 12, the computing system 1 of the second embodiment has essentially the same configuration as the computing system 1 of the first embodiment shown in FIG. 3, but is different therefrom in the contents of the processing of the cycle determining unit 15c and the identifying unit 15d. The different contents will mainly be described below.

The cycle determining unit 15c performs statistical processing to divide the CPU processing states, i.e., the CPIs, stored in the CPU-monitor-result storage unit 14a into a predetermined number of groups. The cycle determining unit 15c then determines the cycle based on the pattern of repetition of the divided groups and stores the determined cycle in the determined-cycle storage unit 14c.

More specifically, by using a hierarchical clustering scheme for statistical processing, the cycle determining unit 15c divides the data of CPIs for respective measurement periods, the data being stored in the CPU-monitor-result storage unit 14a and being shown in FIG. 13, into a first group and a second group, based on the number of groups, "2", pre-received from an analyst. Thus, for example, as indicated by the CPI measurement results shown in the graph in FIG. 11, the cycle determining unit 15c determines that a first group having small CPI values and a second group having large CPI values are repeated.

Thus, the cycle determining unit 15c determines that the cycle is, for example, 900 ns by using the start times "1201 ns", "2101 ns", "3001 ns", and "3901 ns" of the first groups as cycle start times.

The identifying unit 15d associates the cycle stored in the determined-cycle storage unit 14c with the cache-miss-data addresses stored in the cache-miss-data address storage unit 14b to identify a prefetch position and a prefetch-target address, which is the address of data on which prefetch processing is to be performed.

For example, the identifying unit 15d associates the cycle "900 ns" with cache-miss-data addresses shown in FIG. 14 and determines that cache-miss-data address "0xa0000020" appears three times in each of the measurement period 5, measurement period 14, measurement period 23, and measurement period 32. Thus, as shown in FIG. 15, by using the data in the measurement period 5, the identifying unit 15d identifies 0xa0000020 as a prefetch-target address.

As shown in FIG. 15, based on access time "1650 ns" at which the cache miss occurred at 0xa0000020 for the first time in the measurement period 5, the cycle start time "1201 ns", and the memory-access delay time "300 ns", the identifying unit 15d further determines 150 ns (=1650−300−1201+1) as a prefetch position after the start of the cycle.

Based on the prefetch-target address and the prefetch, position stored in the identified-result storage unit 14e by the identifying unit 15d, the prefetch-processing control unit 15e controls the instruction control unit 11 so as to perform prefetch processing for preloading data corresponding to the prefetch-target address from the main memory 20 during the execution of the program. More specifically, at time "150 ns" after the start of each cycle, the prefetch-processing control unit 15e controls the instruction control unit 11 so as to preload the data at 0xa0000020 from the main memory 20 to the cache memory 30.

The processing performed by the computing system 1 of the second embodiment will now be described with reference to FIG. 10. The processing performed by the computing system 1 of the second embodiment is performed in the same manner as the processing (shown in FIG. 10) of the computing system of the first embodiment.

When the computing system 1 of the second embodiment starts the execution of a program (i.e., affirmative in step S1001), the CPU monitor unit 15a and the cache-miss-data address obtaining unit 15b start monitoring of the CPU 10 and obtaining of cache-miss-data addresses (in step S1002), in the same manner as the computing system 1 of the first embodiment.

When the cycle determining unit 15c determines the cycle (i.e., affirmative in step S1003), the identifying unit 15d identifies a prefetch-target address and a prefetch position (in step S1004).

More specifically, the cycle determining unit 15c determines that a first group having small CPI values and a second group having large CPI values are repeated, based on the data of the CPIs for the respective measurement periods, the data being stored in the CPU-monitor-result storage unit 14a and shown in FIG. 13. Further, since the start times of the first group are 1201 ns, 2101 ns, 3001 ns, and 3901 ns, the cycle determining unit determines that the cycle is 900 ns. Thereafter, as shown in FIG. 15, the identifying unit 15d associates the cycle stored in the determined-cycle storage unit 14c with cache-miss-data addresses stored in the cache-miss-data address storage unit 14b to identify prefetch-target address "0xa0000020" and prefetch position "150 ns". The identifying unit 15d waits for the processing, when the cycle determining unit 15c does not determine the cycle (i.e., negative in step S1003).

Subsequently, based on the prefetch-target address and the prefetch position stored in the identified-result storage unit 14e by the identifying unit 15d, the prefetch-processing control unit 15e controls the instruction control unit 11 so as to perform prefetch processing for preloading data corresponding to the prefetch-target address from the main memory 20 during the execution of the program (in step S1005). More specifically, the prefetch-processing control unit 15e controls the instruction control unit 11 so as to preload the data at 0xa0000020 from the main memory 20 to the cache memory 30 at time "150 ns" after the start of each cycle.

When the execution of the program is finished (i.e., affirmative in step S1006), the computing system 1 of the second embodiment ends the processing. When the execution of the program is not finished (i.e., negative in step S1006), the computing system 1 waits until the cycle is determined again.

As described above, according to the second embodiment, the statistical processing is performed to divide the CPIs, which serve as the processing states of the CPU 10, into a predetermined number of groups, and the cycle is determined based on the pattern of repetition of the divided groups. This arrangement makes it possible to determine the cycle with higher accuracy and makes it possible to perform prefetch processing that is effective to improve the execution performance of the program.

Third Embodiment

While the description in the first and second embodiments has been given of a case in which the cycle is automatically determined from the processing states of the CPU, a description in a third embodiment will be given of a case in which an analyst determines the cycle from the processing states of the CPU. While the description in the first and second embodiments has been given of a case in which control is performed so as to perform prefetch processing based on the identified prefetch-target address and prefetch position, a description in the third embodiment will be given of a case in which prefetch processing is performed by automatically inserting a specified prefetch-target address and prefetch position into a program.

Figure 16:
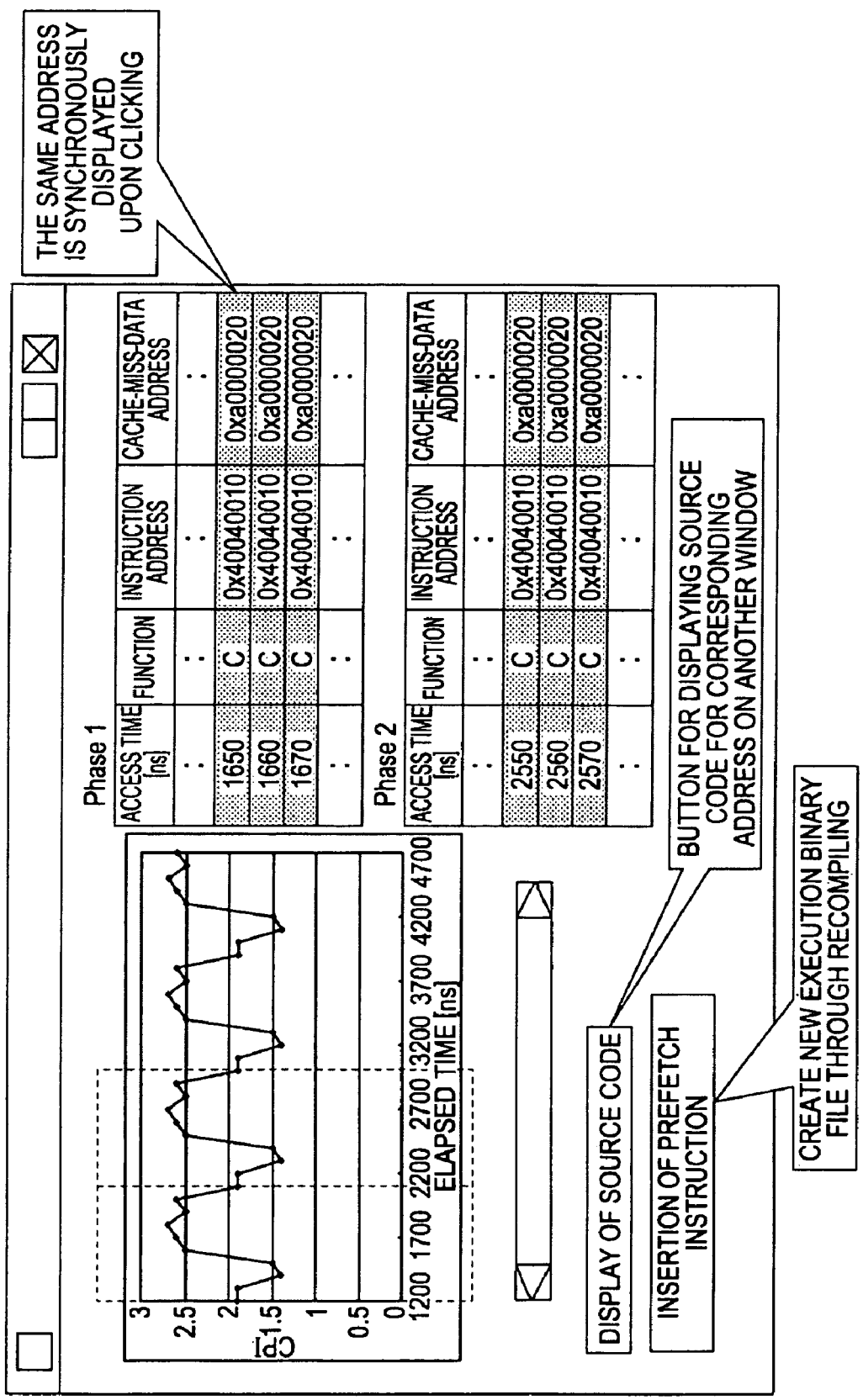
FIG. 16 illustrates an overview and features of a computing system according to a third embodiment.

First, main features of a computing system according to a third embodiment will be specifically described with reference to FIG. 16. FIG. 16 illustrates an overview and features of the computing system of the third embodiment.

The computing system of the third embodiment outputs CPIs, which serve as the monitored processing states of the CPU, receives elapsed times predicted as program-repetition points from a predetermined input unit, and determines the cycle based on the received elapsed time.

That is, based on a display request from the analyst (or programmer), the computing system of the third embodiment displays a graph plotted with a vertical axis indicating CPI values and a horizontal axis indicating time elapsed from the program execution start time, as shown in FIG. 16. Thereafter, when the analyst refers to the graph to determine the cycle and specifies elapsed times (a start point and an end point) predicted as program-repetition points (see a left rectangle indicated by dotted lines in FIG. 16), cache-miss-data addresses in the specified time are displayed in a tabular form (see a table "Phase 1" in FIG. 16). When the analyst further specifies an elapsed time (a start point and an end point) for an area having a similar pattern (see a right rectangle indicated by dotted lines in FIG. 6), cache-miss-data addresses are similarly displayed in a tabular form (see a table "Phase 2" in FIG. 16).

In this case, when the analyst selects a cache-miss-data address in the table "Phase 1", the same cache-miss-data address is synchronously displayed in the table "Phase 2". With this arrangement, the analyst checks the synchronization of the cache-miss-data addresses.

The computing system of the third embodiment then determines that the cycle is, for example, 900 ns, based on the start point and the end point of the specified elapsed times.

When the analyst selects a prefetch-target address from the cache-miss-data address table shown in FIG. 16, the computing system of the third embodiment identifies a prefetch position. For example, when the analyst selects cache-miss-data address "0xa0000020" shown in FIG. 16 as a prefetch-target address, the computing system determines that the prefetch position is 150 ns, based on the access time "1650 ns" shown in the table "Phase 1", the access time "1650 ns" at which a cache miss occurred at 0xa0000020, the cycle start time "1201 ns", and the memory-access delay time "300 ns", in the same manner as the second embodiment.

Although the description in the present embodiment has been given of a case in which the analyst selects a prefetch-target address by referring to the cache-miss-data address table, the present invention is not limited thereto. For example, the arrangement may be such that the number of appeared cache-miss-data addresses is displayed as a histogram and the analyst selects a prefetch-target address by referring to the histogram.

Then, by using source code, the computing system of the third embodiment recompiles the identified prefetch-target address and prefetch position to create a new execution binary file. That is, the computing system of the third embodiment displays, in another window on a screen, a button (see the "display of source code" shown in FIG. 16) for displaying program source code corresponding to the identified prefetch-target address, and the analyst presses the button to check the source code for the corresponding address. When the analyst checks the source code and presses a button "insertion of prefetch instruction" shown in FIG. 16, the computing system of the third embodiment creates a new execution binary file through recompiling using the source code. Consequently, the new execution binary file is created and a prefetch instruction is automatically inserted.

With the arrangement described above, the use of the computing system of the third embodiment makes it possible for, for example, the programmer to easily recognize the processing states of the CPU and to determine the cycle of the program and also makes it possible to perform prefetch processing that is effective to improve the execution performance of the program.

Figure 17:
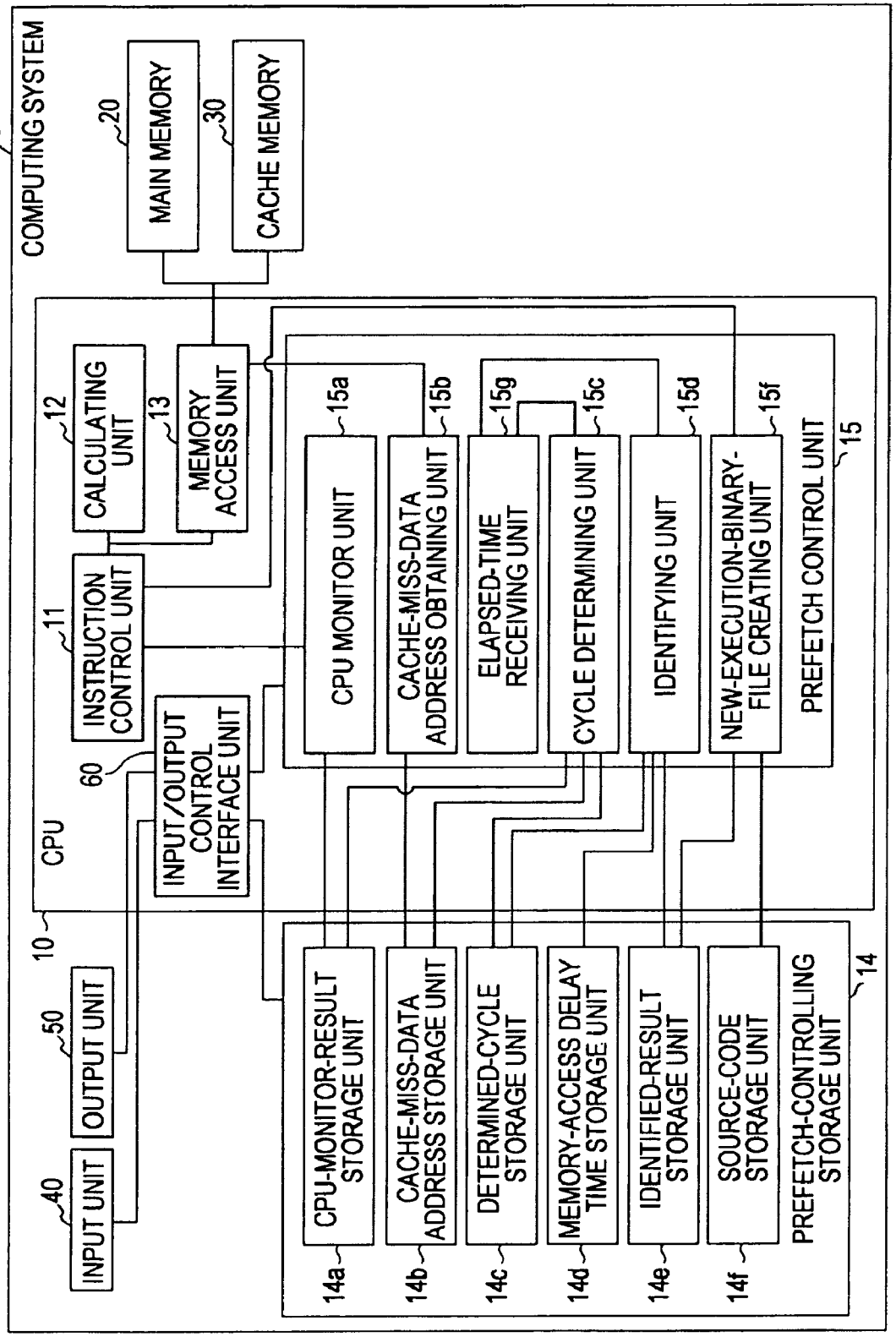
FIG. 17 is a block diagram showing the configuration of the computing system of the third embodiment.

The computing system of the third embodiment will now be described with reference to FIG. 17. FIG. 17 is a block diagram showing the configuration of the computing system of the third embodiment.

As shown in FIG. 17, the computing system 1 of the third embodiment has essentially the same configuration as the computing system 1 of the first embodiment shown in FIG. 3, but is different in that the computing system 1 of the third embodiment further has an input unit 40, an output unit 50, an input/output control interface unit 60, an elapsed-time receiving unit 15g, a new-execution-binary-file creating unit 15f, and a source-code storage unit 14f. The different units will mainly be described below.

The input unit 40 includes a keyboard, a touch panel, and so on to receive a direction from the analyst and is used for processing performed by the elapsed-time receiving unit 15g described below.

The output unit 50 includes a monitor, a speaker, and so on to output a result of processing performed by the elapsed-time receiving unit 15g.

The input/output control interface unit 60 controls transfer of data among the input unit 40, the output unit 50, the prefetch control unit 15, and the prefetch-controlling storage unit 14.

The elapsed-time receiving unit 15g outputs CPIs, which serve as the monitored processing states of the CPU, and receives elapsed times predicted as program-repetition points from the predetermined input unit 40.

More specifically, upon receiving a display request from the analyst (or programmer), the elapsed-time receiving unit 15g displays a graph plotted with a vertical axis indicating CPI values and a horizontal axis indicating time elapsed from the program execution start time, as show in FIG. 16. Thereafter, when the analyst refers to the graph to determine the cycle and specifies elapsed times (a start point and an end point) predicted as program-repetition points (see the left rectangle indicated by dotted lines in FIG. 16), cache-miss-data addresses in the specified time are displayed in a tabular form (see the table "Phase 1" in FIG. 16). When the analyst further specifies elapsed times (a start point and an end point) for an area having a similar pattern (see the right rectangle indicated by dotted lines in FIG. 16), cache-miss-data addresses are similarly displayed in a tabular form (see the table "Phase 2" in FIG. 16).

In this case, when the analyst selects a cache-miss-data address in the table "Phase 1", the same cache-miss-data address is synchronously displayed in the table "Phase 2". With this arrangement, the analyst checks the synchronization of the cache-miss-data addresses.

The cycle determining unit 15c determines that the cycle is, for example, 900 ns, based on the start point and the end point of the specified elapsed times.

When the analyst selects a prefetch-target address by referring to the cache-miss-data address table displayed as a result of the reception performed by the elapsed-time receiving unit 15g, the identifying unit 15d identifies a prefetch position. For example, when the analyst selects the cache-miss-data address "0xa0000020" shown in FIG. 16 as a prefetch-target address, the identifying unit 15d identifies a prefetch position "150 ns", based on the access time "1650 ns" shown in the table "Phase 1", the access time "1650 ns" at which a cache miss occurred at 0xa0000020, the cycle start time "1201 ns", and the memory-access delay time "300 ns".

By using source code stored in the source-code storage unit 14f, the new-execution-binary-file creating unit 15f recompiles the identified prefetch-target address and prefetch position to create a new execution binary file. That is, when the analyst presses the button (see the "display of source code" show in FIG. 16) for displaying program source code corresponding to the identified prefetch-target address on another window and checks the source code and the new-execution-binary-file creating unit 15f receives information indicating that the button for "insertion of prefetch instruction" shown in FIG. 16 is pressed, the new-execution-binary-file creating unit 15f creates a new execution binary file through recompiling using the source code. Consequently, the new execution binary file is created and a prefetch instruction is automatically inserted.

The processing performed by the computing system 1 of the third embodiment will now be described with reference to FIG. 18. FIG. 18 is a flowchart illustrating the processing performed by the computing system 1 of the third embodiment.

When the computing system 1 of the third embodiment starts the execution of a program (i.e., affirmative in step S1801), the CPU monitor unit 15a and the cache-miss-data address obtaining unit 15b start monitoring of the CPU 10 and obtaining of cache-miss-data addresses (in step S1802), as in the computing systems 1 of the first and second embodiments.

Upon receiving a display request for the CPU processing states from the analyst (i.e., affirmative in step S1803), the elapsed-time receiving unit 15g displays the CPU processing states on the monitor included in the output unit 50 (in step S1804). Upon receiving the display request from the analyst, the elapsed-time receiving unit 15g displays, for example, a graph plotted with a vertical axis indicating CPI values and a horizontal axis indicating time elapsed from the program execution start time, as show in FIG. 16.

Subsequently, when the analyst (or programmer) determines the cycle by referring to the graph and specifies elapsed times (a start point and an end point) predicted as program-repetition points, the elapsed-time receiving unit 15g receives the specified elapsed times (i.e., affirmative in step S1805). In response, the cycle determining unit 15c determines the cycle (in step S1806).

Thereafter, the identifying unit 15d identifies a prefetch-target address and a prefetch position (in step S1807).

By using source code, the new-execution-binary-file creating unit 15f recompiles the identified prefetch-target address and prefetch position to create a new execution binary file (in step S1808), and the processing ends. That is, when the analyst presses the button (see the "display of source code" show in FIG. 16) for displaying program source code corresponding to the identified prefetch-target address on another window and checks the source code and the new-execution-binary-file creating unit 15f receives information indicating that the button for the "insertion of prefetch instruction" shown in FIG. 16 is pressed, the new-execution-binary-file creating unit 15f creates a new execution binary file through recompiling using the source code. Consequently, the new execution binary file is created and a prefetch instruction is automatically inserted.

As described above, according to the third embodiment, CPIs which serve as the monitored processing states of the CPU are output, elapsed times predicted as program-repetition points are received from the input unit 40, and the cycle is determined based on the received elapse times. Thus, the programmer can easily recognize the processing states of the CPU to determine the cycle of the program, and it is possible to perform prefetch processing that is effective to improve the execution performance of the program.

According to the third embodiment, an identified prefetch-target address and a prefetch position are recompiled using source code to create a new execution binary file. This arrangement makes it possible to automatically generate a program into which appropriate prefetch processing is inserted, and makes it possible to perform prefetch processing that is effective to improve the execution performance of the program.

Variations

While the computing systems of the first to third embodiments have been described above, the present invention can also be implemented in various different forms other than the embodiments described above. Thus, variations (1) to (4) of the above-described embodiments will now be described by way of example.

(1) New-Execution-Binary-File Creating Unit

Although the description in the third embodiment has been given of a case in which a prefetch-target address and a prefetch position specified by the analyst (or programmer) are recompiled using source code to create a new execution binary file, the present invention is not limited thereto. For example, in the first and second embodiments, a prefetch-target address and a prefetch position specified by the prefetch control unit 15 may be recompiled using source code to create a new execution binary file.

(2) CPU Monitor Unit and Cycle determining Unit

Although the description in the first to third embodiments has been given of a case in which the CPU monitor unit 15a monitors a CPI in each predetermined time as the CPU processing state and the cycle determining unit 15c determines the cycle based on the CPIs, the present invention is not limited thereto. For example, in addition to the CPIs, the CPU monitor unit 15a may monitor, as the CPU processing states, a cache-miss frequency, which is the frequency of cache misses occurred when the CPU 10 processes a program instruction in the predetermined time, so as to allow the cycle determining unit 15c to determine the cycle by referring to the CPIs and the cache-miss frequency.

This arrangement makes it possible to determine the cycle with higher accuracy by referring to the CPIs and the cache-miss frequency and also makes it possible to perform prefetch processing that is effective to improve the execution performance of the program.

(3) System Configuration, Etc.

In addition, of the processing described in the above-described embodiments, all or part of the processing described as being automatically performed may be manually performed (e.g., in the first and second embodiments, the analyst may issue a request for determining the cycle when a predetermined time elapses, rather than the automatic determination of the cycle). Alternatively, all or part of the processing described above as being manually performed may be automatically performed by a known method. Additionally, for example, the processing procedures, specific names, and information (including various types of data and parameters) which are described above and shown in the figures may be arbitrary changed or modified, unless otherwise particularly specified. For example, with respect to cache-miss data addresses to be analyzed by the identifying unit 15d in the first embodiment, the number of cache misses may be changed from two or more to five or more.

The elements of each apparatus shown in the figures do not necessarily have to be physically configured as illustrated in the figures. That is, the specific configuration of the integration or distribution of the processing units and the storage units are not limited to the illustrated configurations (e.g., the configuration shown in FIG. 3). That is, all or some of the processing units and the storage units may be functionally or physically integrated together or distributed in an arbitrary manner depending on various types of load, the use state, and so on. For example, the cycle determining unit 15c and the identifying unit 15d may be integrated together. In addition, all or any of the functions of the processing performed by each apparatus can be implemented by a CPU and a program analyzed and executed by the CPU or can be implemented by wired-logic-based hardware.

(4) Prefetch Processing Program

Although the description in the first to third embodiments has been given of a case in which hardware logics are used to realize various types of processing, the present invention is not limited thereto. For example, a computer may be used to execute a prepared program. Thus, one example of a computer for executing a prefetch-processing program having the same function as the computing system 1 of the first embodiment will be described below with reference to FIG. 19. FIG. 19 is a block diagram showing an example of a computer for executing a prefetch-processing program according to a variation of the first embodiment.

As shown in FIG. 19, a computer 190 serves as an information processing apparatus and includes a keyboard 191, a display 192, a CPU 193, a ROM (read only memory) 194, an HDD (hard disk drive) 195, and a RAM (random access memory) 196, which are connected through a bus 197 and so on. The computer 190 is connected to a CPU 10, a main memory 20, and a cache memory 30.

The ROM 194 pre-stores a prefetch-processing program that serves to provide the same function as the computing system 1 of the first embodiment described above. That is, as shown in FIG. 19, the ROM 194 pre-stores a CPU monitor program 194a, a cache-miss-data address obtaining program 194b, a cycle determining program 194c, an identifying program 194d, and a prefetch-processing control program 194e. These programs 194a to 194e may be integrated together or may be distributed as needed, in the same manner as the elements of the computing system 1 shown in FIG. 3.

When the CPU 193 reads the programs 194a to 194e from the ROM 194 and executes the programs 194a to 194e, they serve as a CPU monitor process 193a, a cache-miss-data address obtaining process 193b, a cycle determining process 193c, an identifying process 193d, and a prefetch-processing control process 193e, as shown in FIG. 19. The CPU monitor process 193a, the cache-miss-data address obtaining process 193b, the cycle determining process 193c, the identifying process 193d, and the prefetch-processing control process 193e correspond to the CPU monitor unit 15a, the cache-miss-data address obtaining unit 15b, the cycle determining unit 15c, the identifying unit 15d, and the prefetch-processing control unit 15e shown in FIG. 3, respectively.

As shown in FIG. 19, the HDD 195 has memory-access delay time data 195a. The memory-access delay time data 195a corresponds to the memory-access delay time storage unit 14d shown in FIG. 3. The CPU 193 registers memory-access delay time data 196d for the memory-access delay time data 195a, reads the memory-access delay time data 196d, and stores it in the RAM 196. The CPU 193 executes prefetch processing, based on CPU-monitor-result data 196a, cache-miss-data address data 196b, determined-cycle data 196c, memory-access delay time data 196d, and identified-result data 196e which are stored in the RAM 196.

The individual programs 194a to 194e do not necessarily have to be initially stored in the ROM 194. For example, the individual programs 194a to 194e may be pre-stored in/on a portable physical medium inserted into the computer 190, on a fixed physical medium placed inside or outside the computer 190, or on another computer (or server) connected to the computer 190 through a public line, the Internet, a LAN (local area network), or a WAN (wide area network), so as to allow the computer 190 to read the programs 194a to 194e therefrom and execute the programs. Examples of the portable physical medium include a flexible disk (FD), a CD-ROM, a magneto-optical (MO) disk, a DVD (digital versatile disk), and an IC (integrated circuit) card. Examples of the fixed physical medium include an HDD.

What is claimed is:

1. A prefetch processing apparatus for performing prefetch processing for preloading data from a main memory to a cache memory, the data being used when a central processing unit executes a program, the prefetch processing apparatus comprising:

a central-processing-unit monitor unit that monitors, during the execution of the program, processing states of the central processing unit at a plurality of predefined time periods, each of the time periods being measured relative to time elapsed from start time of executing the program;

a cache-miss-data address obtaining unit that obtains, during the execution of the program, cache-miss-data addresses within the predefined time periods, the cache-miss-data addresses being addresses of data resulting from accessing the main memory due to a cache miss;

a cycle determining unit that determines a cycle of time required for executing the program between at least two select predefined time periods, based on the central-processing -unit processing states monitored by the central-processing-unit monitor unit; and an identifying unit that identifies a prefetch position in a cycle in which a prefetch-target address is to be prefetched by associating the cycle determined by the cycle determining unit with the cache-miss-data addresses obtained by the cache-miss-data address obtaining unit, the prefetch-target address being an address of data on which prefetch processing is to be performed.

2. The prefetch processing apparatus according to claim 1, further comprising a prefetch-processing control unit that performs control so as to perform prefetch processing for preloading data corresponding to the prefetch-target address from the main memory during the execution of the program, based on the prefetch-target address and the prefetch position identified by the identifying unit.

3. The prefetch processing apparatus according to claim 1, wherein the central-processing-unit monitor unit further monitors, as each central-processing-unit processing state, an average number of clocks that the central-processing-unit requires to process a single instruction of the program in a predetermined time and/or a cache-miss frequency, which is a frequency of cache misses that occurs when the central processing unit processes the instruction of the program in the predetermined time, and the cycle determining unit determines the cycle by referring to the average number of clocks and/or the cache-miss frequency.

4. The prefetch processing apparatus according to claim 3, wherein the cycle determining unit determines the cycle, based on the monitored average number of clocks in the predetermined time and a cache-miss-data address at which the number of cache misses was greatest in the predetermined time.

5. The prefetch processing apparatus according to claim 1, wherein the cycle determining unit performs statistical processing to divide the central-processing-unit processing state monitored by the central-processing-unit monitor unit into a predetermined number of groups, and determines the cycle based on a pattern of repetition of the divided groups.

6. The prefetch processing apparatus according to claim 1, further comprising an elapsed-time receiving unit that outputs the central-processing-unit processing states monitored by the central-processing-unit monitor unit and that receives elapsed times from a predetermined input unit, the elapsed times being predicted as repetition points of the program, wherein the cycle determining unit determines the cycle based on the elapsed times received by the elapsed-time receiving unit.

7. The prefetch processing apparatus according to claim 1, further comprising a new-execution-binary-file creating unit that creates a new execution binary file, by using source code to recompile the prefetch-target address and the prefetch position identified by the identifying unit.

8. A storage medium that stores a prefetch processing program for causing a computer to execute a prefetch processing method for preloading data from a main memory to a cache memory, the data being used when a central processing unit executes a program, the prefetch processing method comprising:
  a central-processing-unit monitoring step of monitoring, during the execution of the program, processing states of the central processing unit at a plurality of predefined time periods, each of the time periods being measured relative to time elapsed from start time of executing the program;
  a cache-miss-data address obtaining step of obtaining, during the execution of the program, cache-miss-data addresses within the predefined time periods, the cache-miss-data addresses being addresses of data resulting from accessing the main memory due to a cache miss;
  a cycle determining step of determining a cycle of time required for executing the program between at least two select predefined time periods, based on the central-processing-unit processing states monitored in the central-processing-unit monitoring step; and
  an identifying step of identifying a prefetch position in a cycle in which a prefetch-target address is to be prefetched by associating the cycle determined in the cycle determining step with the cache-miss-data addresses obtained in the cache-miss-data address obtaining step, the prefetch-target address being an address of data on which prefetch processing is to be performed.

9. The storage medium according to claim 8, wherein the prefetch processing method further comprises a prefetch-processing controlling step of performing control so as to perform prefetch processing for preloading data corresponding to the prefetch-target address from the main memory during the execution of the program, based on the prefetch-target address and the prefetch position identified in the identifying step.

10. A prefetch-processing method for preloading data from a main memory to a cache memory, the data being used when a central processing unit executes a program, the prefetch-processing method comprising:
  a central-processing-unit monitoring step of monitoring, during the execution of the program, processing states of the central processing unit at a plurality of predefined time periods, each of the time period being measured relative to time elapsed from start time of executing the program;
  a cache-miss-data address obtaining step of obtaining, during the execution of the program, cache-miss-data addresses within the predefined timeeriods, the cache-miss-data addresses being addresses of data resulting from accessing the main memory due to a cache miss;
  a cycle determining step of determining a cycle of time required for executing the program between at least two select predefined time periods, based on the central-processing-unit processing states monitored in the central-processing-unit monitoring step; and
  an identifying step of identifying a prefetch position in a cycle in which a prefetch-target address is to be prefetched by associating the cycle determined in the cycle determining step with the cache-miss-data addresses obtained in the cache-miss-data address obtaining step, the prefetch-target address being an address of data on which prefetch processing is to be performed.

11. A prefetch-processing apparatus for performing prefetch processing for preloading data from a main memory to a cache memory, the data being used when a central processing unit executes a program, the prefetch-processing apparatus comprising:
  means for monitoring, during the execution of the program, processing states of the central processing unit at a plurality of predefined time periods, each of the time periods being measured relative to time elapsed from start time of executing the program;
  means for obtaining, during the execution of the program, cache-miss-data addresses within the predefined time periods, the cache-miss-data addresses being addresses of data resulting from accessing the main memory due to a cache miss;
  means for determining a cycle of time required for executing the program between at least two select predefined time periods, based on the central-processing-unit processing states monitored by the central-processing-unit monitoring means; and
  means for identifying a prefetch position in a cycle in which a prefetch-target address is to be prefetched by associating the cycle determined by the cycle determining means with the cache-miss-data addresses obtained by the cache-miss-data address obtaining means, the prefetch-target address being an address of data on which prefetch processing is to be performed.

* * * * *